US012705081B2

(12) United States Patent
Jiang et al.

(10) Patent No.: US 12,705,081 B2
(45) Date of Patent: Aug. 11, 2026

(54) INTELLIGENTLY SCALING DATABASE AS A SERVICE RESOURCES IN A CLOUD PLATFORM

(71) Applicant: International Business Machines Corporation, Armonk, NY (US)

(72) Inventors: Peng Hui Jiang, Beijing (CN); Yue Wang, Beijing (CN); Jun Su, Beijing (CN); Su Liu, Austin, TX (US); Sheng Yan Sun, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 271 days.

(21) Appl. No.: 17/952,244

(22) Filed: Sep. 24, 2022

(65) Prior Publication Data

US 2024/0103896 A1 Mar. 28, 2024

(51) Int. Cl.
*G06F 9/455* (2018.01)
*G06F 9/38* (2018.01)

(52) U.S. Cl.
CPC ........ *G06F 9/45558* (2013.01); *G06F 9/3838* (2013.01); *G06F 2009/4557* (2013.01); *G06F 2009/45595* (2013.01)

(58) Field of Classification Search
CPC ............... G06F 9/45558; G06F 9/3838; G06F 2009/4557; G06F 2009/45595; G06F 16/21; G06F 2009/45591
See application file for complete search history.

(56) References Cited

U.S. PATENT DOCUMENTS 11,861,405 B2 * 1/2024 Anand ................ G06F 11/3447
2016/0094477 A1 * 3/2016 Bai ....................... H04L 47/786
709/226

(Continued)

FOREIGN PATENT DOCUMENTS

CN 110278122 A 9/2019

OTHER PUBLICATIONS

Das et al., "Automated Demand-driven Resource Scaling in Relational Database-as-a-Service," Proceedings of the 2016 International Conference on Management of Data, Jun. 2016, pp. 1923-1934.

(Continued)

*Primary Examiner* — Kenneth Tang
(74) *Attorney, Agent, or Firm* — Steven M. Bouknight

(57) ABSTRACT

A computer-implemented method, system and computer program product for scaling a resource of a Database as a Service (DBaaS) cluster in a cloud platform. User service requests from a service cluster to be processed by the DBaaS cluster are received. A first set of tracing data is generated by a service mesh, which facilitates service-to-service communication between the service cluster and the DBaaS cluster, from the user service requests. A second set of tracing data is generated by the DBaaS cluster from handling the user service requests. A dependency tree is then generated to discover application relationships to identify potential bottlenecks in nodes of the DBaaS cluster based on these sets of tracing data. The pod(s) of a DBaaS node are then scaled based on the dependency tree, which is used in part, to predict the utilization of the resources of the DBaaS node identified as being a potential bottleneck.

20 Claims, 7 Drawing Sheets

(56) References Cited

U.S. PATENT DOCUMENTS

2019/0325370 A1 10/2019 Das et al.
2019/0379731 A1* 12/2019 Johnsen .............. H04L 67/1008
2020/0249928 A1* 8/2020 Zeng ..................... G06F 9/5038
2020/0409715 A1* 12/2020 Balasubramanian ........................ G06F 11/3065
2022/0014963 A1* 1/2022 Yeh ................... H04W 28/0268
2023/0043336 A1* 2/2023 Mitkar .................. G06F 3/0631
2024/0305533 A1* 9/2024 Bai ....................... H04W 24/02

OTHER PUBLICATIONS

Parker et al., "Flexible Pricing, Vertical Scaling, and Monitoring Available for Hyper Protect DBaaS," https://www.ibm.com/cloud/blog/announcements/flexible-pricing-vertical-scaling-and-monitoring-available-for-hyper-protect-dbaas, Dec. 7, 2020,.
Lockwood Lyon, "Database as a Service: Performance Tuning," https://www.databasejournal.com/db2/database-as-a-service-performance-tuning, Database Journal, Jul. 17, 2017, pp. 1-3.
Segalin et al., DBaaS Multitenancy, Auto-tuning and SLA Maintenance in Cloud Environments: a Brief Survey, Brazilian Journal of Information Systems, vol. 11. No. 2, Jun. 2018, pp. 30-42.

* cited by examiner

400

| Request Type (401) | Service Pair (402) | Time (403) | Doc Count (404) |
|---|---|---|---|
| Type 1 | X->A | 6s | 0.5M |
| Type 2 | A->B | 8s | 2.5M |
| Type 3 | B->C | 6s | 15M |

INTELLIGENTLY SCALING DATABASE AS A SERVICE RESOURCES IN A CLOUD PLATFORM

TECHNICAL FIELD

The present disclosure relates generally to Database as a Service (DBaaS), and more particularly to intelligently scaling the pods (encapsulates sidecars and services) used for DBaaS in a cloud platform.

BACKGROUND

Database as a Service (DBaaS) is a cloud computing managed service offering that provides access to a database without requiring the setup of physical hardware, the installation of software or the need to configure the database. Most maintenance and administrative tasks are handled by the service provider thereby freeing up users to quickly benefit from using the database.

Recently, DBaaS is being implemented using a microservices approach as opposed to a monolithic approach. The monolithic approach corresponds to the traditional model of a software program in which the software program is built as a unified unit that is self-contained and independent from other applications. The microservices approach corresponds to a method that relies on a series of independently deployable services. That is, the microservices approach corresponds to an architectural and organizational approach to software development where software is composed of small independent services that communicate over well-defined application programming interfaces. These services have their own business logic and database with a specific goal. Updating, testing, deployment, and scaling occur within each service. Microservices decouple major business, domain-specific concerns into separate, independent code bases.

The microservices approach to implementing DBaaS may utilize containers. A container refers to a standard unit of software that packages up code and all its dependencies so that the application runs quickly and reliably from one computing environment to another. Such microservices may run in their own containers.

In such an environment, these containers may be run in "pods." All the containers in the pod share an Internet Protocol (IP) address, inter-process communication (IPC), hostname and other resources. A "pod" is a group of one or more containers, which may be deployed to a node, referred to as a "worker node." A worker node is used to run containerized applications and handle networking to ensure that traffic between applications across the cluster and from outside of the cluster can be properly facilitated. A "cluster" refers to a set of nodes (e.g., worker nodes) that run containerized applications (containerized applications package an application with its dependencies and necessary services). Such a cluster ("DBaaS cluster") may be used to process DBaaS service requests.

At times, the DBaaS cluster may receive an inordinate amount of service requests to be processed. As a result, the DBaaS resources may be scaled in order to handle the increased workload. For example, in response to the increased load, horizontal scaling may be implemented by a horizontal pod autoscaler to deploy more pods. Such horizontal scaling is different from vertical scaling which assigns more resources (e.g., memory, CPU) to the pods that are already running for the workload.

If the load decreases and the number of pods is above the configured minimum, the horizontal pod autoscaler instructs the workload resource to scale back down.

The DBaaS cluster may receive various types of requests to be processed. For example, the DBaaS cluster may receive a create, read, update or delete request to be processed. Such a request (create, read, update or delete requests are collectively referred to as a "CRUD" request) though may automatically generate numerous downstream requests, such as for indexing and replication. For example, the CRUD request may generate downstream requests for indexing and replication which are processed by the containers of the pods in the DBaaS cluster. For instance, the containers of a particular pod may be utilized to process the downstream requests for indexing and the containers of another particular pod may be utilized to process the downstream requests for replication.

As a result of a request being converted into multiple requests with upstream and downstream relationships, the DBaaS cluster may not be able to service such requests in an efficient manner thereby resulting in a system bottleneck which negatively impacts system performance. A "system bottleneck," as used herein, refers to an overloaded system in which components of the system, such as the DBaaS cluster, are unable to keep pace with the system thereby slowing overall performance.

Unfortunately, the scaling mechanism discussed above, such as horizontal scaling by a horizontal pod autoscaler, is only able to address such a system bottleneck after the problem has impacted system performance. For example, such scaling occurs after the observed metrics, such as memory and CPU performance, has indicated that scaling is necessary. As a result, the scaling mechanism discussed above does not address such a system bottleneck since the DBaaS throughput cannot be changed in time in the cloud platform.

SUMMARY

In one embodiment of the present disclosure, a computer-implemented method for scaling a resource of a Database as a Service (DBaaS) cluster in a cloud platform comprises receiving user service requests from a service cluster to be processed by the DBaaS cluster, where the DBaaS cluster comprises one or more nodes, and where each of the one or more nodes comprises one or more pods containing a group of one or more containers. The method further comprises generating a first set of tracing data from the user service requests by a service mesh facilitating service-to-service communication between the service cluster and the DBaaS cluster. The method additionally comprises generating a second set of tracing data by the DBaaS cluster from handling the user service requests. Furthermore, the method comprises generating a dependency tree to discover application relationships to identify potential bottlenecks in nodes of the DBaaS cluster based on the first and second sets of tracing data. Additionally, the method comprises scaling one or more pods of a node of the DBaaS cluster based on the dependency tree.

In this manner, system bottlenecks at the DBaaS are addressed by identifying potential bottlenecks involving nodes of the DBaaS cluster and intelligently scaling the pods in a node of the DBaaS cluster identified as being a potential bottleneck prior to the bottleneck actually occurring.

In another embodiment of the present disclosure, a computer program product for scaling a resource of a Database as a Service (DBaaS) cluster in a cloud platform, where the computer program product comprises one or more computer readable storage mediums having program code embodied therewith, where the program code comprising programming instructions for receiving user service requests from a service cluster to be processed by the DBaaS cluster, where the DBaaS cluster comprises one or more nodes, and where each of the one or more nodes comprises one or more pods containing a group of one or more containers. The program code further comprises the programming instructions for generating a first set of tracing data from the user service requests by a service mesh facilitating service-to-service communication between the service cluster and the DBaaS cluster. The program code additionally comprises the programming instructions for generating a second set of tracing data by the DBaaS cluster from handling the user service requests. Furthermore, the program code comprises the programming instructions for generating a dependency tree to discover application relationships to identify potential bottlenecks in nodes of the DBaaS cluster based on the first and second sets of tracing data. Additionally, the program code comprises the programming instructions for scaling one or more pods of a node of the DBaaS cluster based on the dependency tree.

In this manner, system bottlenecks at the DBaaS are addressed by identifying potential bottlenecks involving nodes of the DBaaS cluster and intelligently scaling the pods in a node of the DBaaS cluster identified as being a potential bottleneck prior to the bottleneck actually occurring.

In a further embodiment of the present disclosure, a system comprises a memory for storing a computer program for scaling a resource of a Database as a Service (DBaaS) cluster in a cloud platform and a processor connected to the memory. The processor is configured to execute program instructions of the computer program comprising receiving user service requests from a service cluster to be processed by the DBaaS cluster, where the DBaaS cluster comprises one or more nodes, and where each of the one or more nodes comprises one or more pods containing a group of one or more containers. The processor is further configured to execute the program instructions of the computer program comprising generating a first set of tracing data from the user service requests by a service mesh facilitating service-to-service communication between the service cluster and the DBaaS cluster. The processor is additionally configured to execute the program instructions of the computer program comprising generating a second set of tracing data by the DBaaS cluster from handling the user service requests. Furthermore, the processor is configured to execute the program instructions of the computer program comprising generating a dependency tree to discover application relationships to identify potential bottlenecks in nodes of the DBaaS cluster based on the first and second sets of tracing data. Additionally, the processor is configured to execute the program instructions of the computer program comprising scaling one or more pods of a node of the DBaaS cluster based on the dependency tree.

In this manner, system bottlenecks at the DBaaS are addressed by identifying potential bottlenecks involving nodes of the DBaaS cluster and intelligently scaling the pods in a node of the DBaaS cluster identified as being a potential bottleneck prior to the bottleneck actually occurring.

The foregoing has outlined rather generally the features and technical advantages of one or more embodiments of the present disclosure in order that the detailed description of the present disclosure that follows may be better understood. Additional features and advantages of the present disclosure will be described hereinafter which may form the subject of the claims of the present disclosure.

BRIEF DESCRIPTION OF THE DRAWINGS

A better understanding of the present disclosure can be obtained when the following detailed description is considered in conjunction with the following drawings, in which.

DETAILED DESCRIPTION

Figure 1:
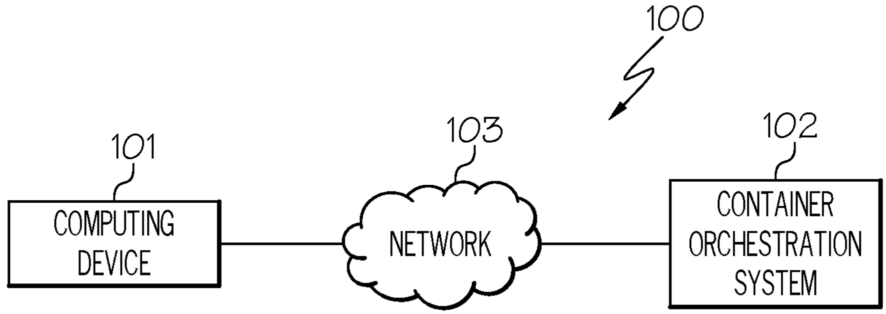
FIG. 1 illustrates a communication system for practicing the principles of the present disclosure in accordance with an embodiment of the present disclosure.

As stated in the Background section, the DBaaS cluster may receive various types of requests to be processed. For example, the DBaaS cluster may receive a create, read, update or delete request to be processed. Such a request (create, read, update or delete requests are collectively referred to as a "CRUD" request) though may automatically generate numerous downstream requests, such as for indexing and replication. For example, the CRUD request may generate downstream requests for indexing and replication which are processed by the containers of the pods in the DBaaS cluster. For instance, the containers of a particular pod may be utilized to process the downstream requests for indexing and the containers of another particular pod may be utilized to process the downstream requests for replication.

As a result of a request being converted into multiple requests with upstream and downstream relationships, the DBaaS cluster may not be able to service such requests in an efficient manner thereby resulting in a system bottleneck which negatively impacts system performance. A "system bottleneck," as used herein, refers to an overloaded system in which components of the system, such as the DBaaS cluster, are unable to keep pace with the system thereby slowing overall performance.

Unfortunately, the scaling mechanism discussed above, such as horizontal scaling by a horizontal pod autoscaler, is only able to address such a system bottleneck after the problem has impacted system performance. For example, such scaling occurs after the observed metrics, such as memory and CPU performance, has indicated that scaling is necessary. As a result, the scaling mechanism discussed above does not address such a system bottleneck since the DBaaS throughput cannot be changed in time in the cloud platform.

The embodiments of the present disclosure provide a means for addressing system bottlenecks at the DBaaS by identifying potential bottlenecks involving nodes of the DBaaS cluster and intelligently scaling the pods in a node of the DBaaS cluster identified as being a potential bottleneck prior to the bottleneck actually occurring. In one embodiment, potential bottlenecks in the nodes of the DBaaS cluster are identified based on discovering the application relationships for handling requests that generate downstream requests, such as for indexing and replication, by the components of the nodes of the DBaaS cluster. In one embodiment, such application relationships may be discovered by generating a dependency tree using tracing data for handling such service requests (tracing data illustrates how the service components of a node of a DBaaS cluster operate, execute and perform in handling service requests). After generating such a dependency tree, potential bottlenecks in the nodes of the DBaaS cluster can be identified. When a service request is received by the DBaaS cluster that corresponds to one of the service requests upon which the dependency tree was generated, a potential bottleneck in handling such a service request in a node of the DBaaS cluster may be identified from the dependency tree. Consumption predictors (e.g., memory utilization, timeline of called components of the node of the DBaaS cluster, traffic generation model, etc.) for the components of the node of the DBaaS cluster identified as being a potential bottleneck may be analyzed so that the utilization of the resources for such components is determined. The predicted utilization of the resources for the components of the DBaaS node identified as being a potential bottleneck is determined based on the determined utilization of the resources of the components of the DBaaS node identified as being a potential bottleneck and a timeline of called components of the DBaaS cluster. A scale operation may then be executed to scale one or more pods in the node of the DBaaS cluster identified as being a potential bottleneck in response to the predicted utilization of the resources being above or below a threshold level. A more detailed description of these and other features will be provided below.

In some embodiments of the present disclosure, the present disclosure comprises a computer-implemented method, system and computer program product for scaling a resource of a Database as a Service (DBaaS) cluster in a cloud platform. In one embodiment of the present disclosure, user service requests from a service cluster to be processed by the DBaaS cluster are received. A "service cluster," as used herein, refers to a cluster of nodes for receiving and forwarding service requests to the DBaaS cluster. A "DBaaS cluster," as used herein, refers to a cluster of nodes for handling such service requests. For example, an ingress gateway of the service cluster may receive and forward such requests to a sidecar which invokes a DBaaS service to handle such a service request. The DBaaS cluster and the service cluster each consists of a set of worker machines, called nodes, that run containerized applications (containerized applications package an application with its dependencies and necessary services). Each of the nodes may include one or more pods containing a group of one or more containers. A "container," as used herein, refers to a standard unit of software that packages up code and all its dependencies so that the application runs quickly and reliably from one computing environment to another. A first set of tracing data from the user service requests is generated by a service mesh facilitating service-to-service communication between the service cluster and the DBaaS cluster. A second set of tracing data is generated by the DBaaS cluster from handling the user service requests. Such tracing data (both first and second sets) illustrates how the service components of a node of a DBaaS cluster operate, execute and perform in handling service requests. A dependency tree is then generated to discover application relationships to identify potential bottlenecks in nodes of the DBaaS cluster based on the first and second sets of tracing data. A "dependency tree," as used herein, refers to a graph illustrating the relationship between the services, such as the service pairs handling a particular type of request (e.g., create request, indexing, replication). One or more pods of a node of the DBaaS cluster are then scaled (scaled up or down) based on the dependency tree, which is used in part, to predict the utilization of the resources of the components of the DBaaS node identified as being a potential bottleneck. When the predicted utilization of the resources is above or below a threshold level, a scale operation is executed to scale the pod(s) of the DBaaS node identified as being a potential bottleneck. In this manner, system bottlenecks at the DBaaS are addressed by identifying potential bottlenecks involving nodes of the DBaaS cluster and intelligently scaling the pod(s) in a node of the DBaaS cluster identified as being a potential bottleneck prior to the bottleneck actually occurring.

In the following description, numerous specific details are set forth to provide a thorough understanding of the present disclosure. However, it will be apparent to those skilled in the art that the present disclosure may be practiced without such specific details. In other instances, well-known circuits have been shown in block diagram form in order not to obscure the present disclosure in unnecessary detail. For the most part, details considering timing considerations and the like have been omitted inasmuch as such details are not necessary to obtain a complete understanding of the present disclosure and are within the skills of persons of ordinary skill in the relevant art.

Referring now to the Figures in detail, FIG. 1 illustrates an embodiment of the present disclosure of a communication system 100 for practicing the principles of the present disclosure. Communication system 100 includes a computing device 101 connected to a container orchestration system 102 via a network 103.

Computing device 101 may be any type of computing device (e.g., portable computing unit, Personal Digital Assistant (PDA), laptop computer, mobile device, tablet personal computer, smartphone, mobile phone, navigation device, gaming unit, desktop computer system, workstation, Internet appliance and the like) configured with the capability of connecting to network 103 and consequently communicating with other computing devices 101 and container orchestration system 102. It is noted that both computing device 101 and the user of computing device 101 may be identified with element number 101.

In one embodiment, the user of computing device 101 issues a request to access a database managed by a Database as a Service (DBaaS) running on container orchestration system 102 (e.g., Kubernetes®).

Network 103 may be, for example, a local area network, a wide area network, a wireless wide area network, a circuit-switched telephone network, a Global System for Mobile Communications (GSM) network, a Wireless Application Protocol (WAP) network, a WiFi network, an IEEE 802.11 standards network, various combinations thereof, etc. Other networks, whose descriptions are omitted here for brevity, may also be used in conjunction with system 100 of FIG. 1 without departing from the scope of the present disclosure.

In one embodiment, the DBaaS platform is built on container orchestration system 102. In one embodiment, container orchestration system 102 identifies potential bottlenecks in the nodes of the DBaaS cluster based on discovering the application relationships for handling requests that generate downstream requests, such as for indexing and replication, by the components of the node of the DBaaS cluster. In one embodiment, such application relationships may be discovered by generating a dependency tree using tracing data for handling such service requests (tracing data illustrates how the service components of a node of a DBaaS cluster operate, execute and perform in handling service requests). After generating such a dependency tree, potential bottlenecks in the nodes of the DBaaS cluster can be identified. When a service request is received by the DBaaS cluster that corresponds to one of the service requests upon which the dependency tree was generated, a potential bottleneck in handling such a service request in a node of the DBaaS cluster may be identified from the dependency tree. Consumption predictors (e.g., memory utilization, timeline of called components of the node of the DBaaS cluster, traffic generation model, etc.) for the components of the node of the DBaaS cluster identified as being a potential bottleneck may be analyzed so that the utilization of the resources for such components is determined. The predicted utilization of the resources for the components of the DBaaS node identified as being a potential bottleneck is determined based on the determined utilization of the resources of the components of the DBaaS node identified as being a potential bottleneck and a timeline of called components of the DBaaS cluster. A scale operation may then be executed to scale one or more pods in the node of the DBaaS cluster identified as being a potential bottleneck in response to the predicted utilization of the resources being above or below a threshold level. A more detailed description of these and other features will be provided below.

A description of the architecture of the DBaaS platform built on container orchestration system 102 is provided below in connection with FIG. 2. Furthermore, a description of the hardware configuration of container orchestration system 102 is provided further below in connection with FIG. 6.

System 100 is not to be limited in scope to any one particular network architecture. System 100 may include any number of computing devices 101, container orchestration systems 102 and networks 103.

Figure 2:
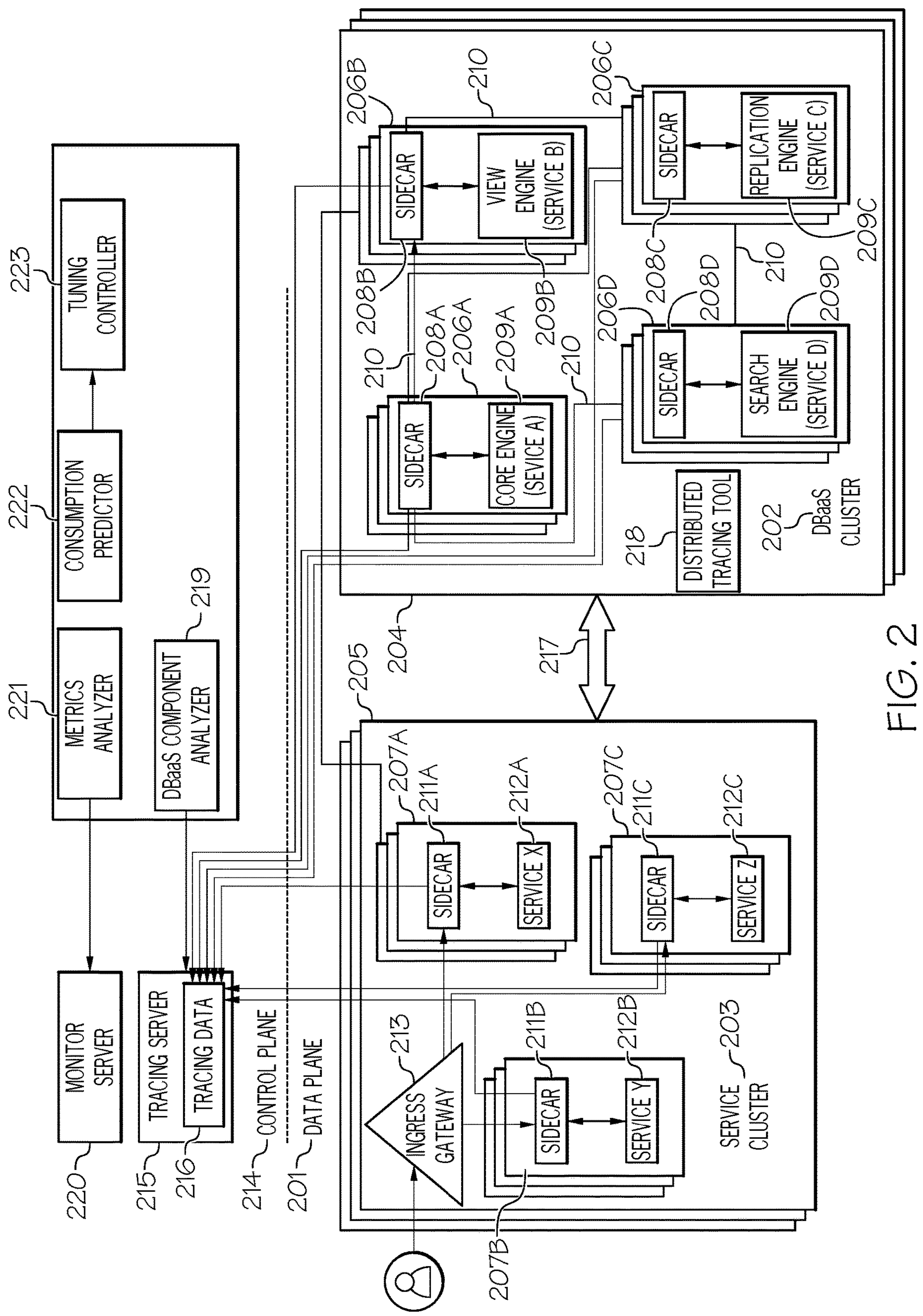
FIG. 2 illustrates the architecture of the DBaaS platform built on a container orchestration system in accordance with an embodiment of the present disclosure.

Referring now to FIG. 2, FIG. 2 illustrates the architecture of the DBaaS platform built on container orchestration system 102 in accordance with an embodiment of the present disclosure.

As shown in FIG. 2, the architecture of the DBaaS platform includes a data plane 201 which includes a DBaaS cluster 202 and a service cluster 203. A "service cluster" 203, as used herein, refers to a cluster of nodes for receiving and forwarding service requests to the DBaaS cluster. A "DBaaS cluster" 202, as used herein, refers to a cluster of nodes for handling such service requests. In one embodiment, DBaaS cluster 202 and service cluster 203 each consists of a set of worker machines, called nodes, that run containerized applications (containerized applications package an application with its dependencies and necessary services). For example, DBaaS cluster 202 consists of a set of nodes 204 (one or more worker nodes) and service cluster 203 consists of a set of nodes 205 (one or more worker nodes). Worker nodes 204, 205 are used to run containerized applications and handle networking to ensure that traffic between applications across the cluster and from outside of the cluster can be properly facilitated.

In one embodiment, worker node(s) 204, 205 host the pods that are components of the application workload. For example, node 204 hosts pods 206A-206D and node 205 hosts pods 207A-207C. Pods 206A-206D may collectively or individually be referred to as pods 206 or pod 206, respectively. Furthermore, pods 207A-207C may collectively or individually be referred to as pods 207 or pod 207, respectively. Each node 204, 205 may host any number of pods 206, 207, respectively.

A "pod" 206, 207, as used herein, is a group of one or more containers, which are deployed to a node (e.g., node 204, 205). For example, pod 206A contains a sidecar container 208A and a service 209A (identified as "Service A" corresponding to the core engine). Pod 206B contains a sidecar container 208B and a service 209B (identified as "Service B" corresponding to the view engine). Pod 206C contains a sidecar container 208C and a service 209C (identified as "Service C" corresponding to the replication engine). Pod 206D contains a sidecar container 208D and a service 209D (identified as "Service D" corresponding to the search engine). Containers 208A-208D of DBaaS cluster 202 may collectively or individually be referred to as containers 208 or container 208, respectively. Services 209A-209D of DBaaS cluster 202 may collectively or individually be referred to as services 209 or service 209, respectively.

The relationship between such components (containers 208, services 209) are shown in FIG. 2 by lines 210. Such a relationship may be discovered by generating the dependency tree as discussed in further detail below.

Furthermore, as shown in FIG. 2, pod 207A contains a sidecar container 211A and a service 212A (identified as "Service X"). Pod 207B contains a sidecar container 211B and a service 212B (identified as "Service Y"). Furthermore, pod 207C contains a sidecar container 211C and a service 212C (identified as "Service Z"). Containers 211A-211C of service cluster 203 may collectively or individually be referred to as containers 211 or container 211, respectively. Services 212A-212C of service cluster 203 may collectively or individually be referred to as services 212 or service 212, respectively.

Sidecars 208, 211, as used herein, refer to separate containers that run alongside an application container in a pod.

It is noted that pods 206, 207 may contain any number of containers 208, 211, respectively, and services 209, 212, respectively, and that FIG. 2 is illustrative.

Furthermore, as shown in FIG. 2, service cluster 203 includes an ingress gateway 213 for receiving service requests issued by a user, such as a user of computing device 101. Such service requests may then be forwarded to a sidecar 211 which invokes a DBaaS service to handle such a service request.

Additionally, as shown in FIG. 2, the architecture of the DBaaS platform includes a control plane 214 which manages worker nodes 204, 205 and pods 206, 207 in clusters 202, 203, respectively.

In one embodiment, control plane 214 includes a tracing server 215 configured to store tracing data 216, where such tracing data 216 captures data that illustrates how the components (e.g., sidecars 208, services 209) operate, execute and perform. In one embodiment, tracing data 216 may be obtained from a service mesh 217 that facilitates service-to-service communication between service cluster 203 and DBaaS cluster 202. In one embodiment, service mesh 217 controls how different parts of an application share data with one another. In one embodiment, service mesh 217 corresponds to a dedicated infrastructure layer for facilitating service-to-service communications between services or microservices, using a proxy. In one embodiment, service mesh 217 consists of network proxies paired with each service in an application and a set of task management processed. The proxies are called the "data plane" 201 and the management processes are called the "control plane" 214. In one embodiment, data plane 201 intercepts calls between different services and processes them; whereas, control plane 214 coordinates the behavior of proxies and provides APIs for operations and maintenance. In one embodiment, the service mesh architecture is implemented using various software tools including, but not limited to, Istio®, Linkerd®, Consul®, Traefik Mesh®, etc.

In one embodiment, service mesh 217 generates tracing data 216 by generating distributed traces spans for each service within it (see lines from sidecars 208, 211 to tracing data 216 as shown in FIG. 2). Such traces can be used to follow a single request (user service request received by ingress gateway 213) through the mesh across multiple services and proxies.

In one embodiment, service mesh 217 stores the generated tracing data 216 in tracing server 215.

In one embodiment, tracing data 216 is further obtained from DBaaS cluster 202 from handling the user service requests. In one embodiment, DBaaS cluster 202 utilizes a distributed tracing tool 218 for obtaining tracing data 216 from DBaaS cluster 202 handling the user service requests. In one embodiment, distributed tracing tool 218 may perform distributed tracing using various software tools, including, but not limited to, SigNoz®, Jaeger, Zipkin, Dynatrace®, New Relic®, Honeycomb®, Lightstep®, Instana®, DataDog®, Splunk®, etc.

In one embodiment, distributed tracing tool 218 stores the generated tracing data 216 in tracing server 215.

Figure 3:
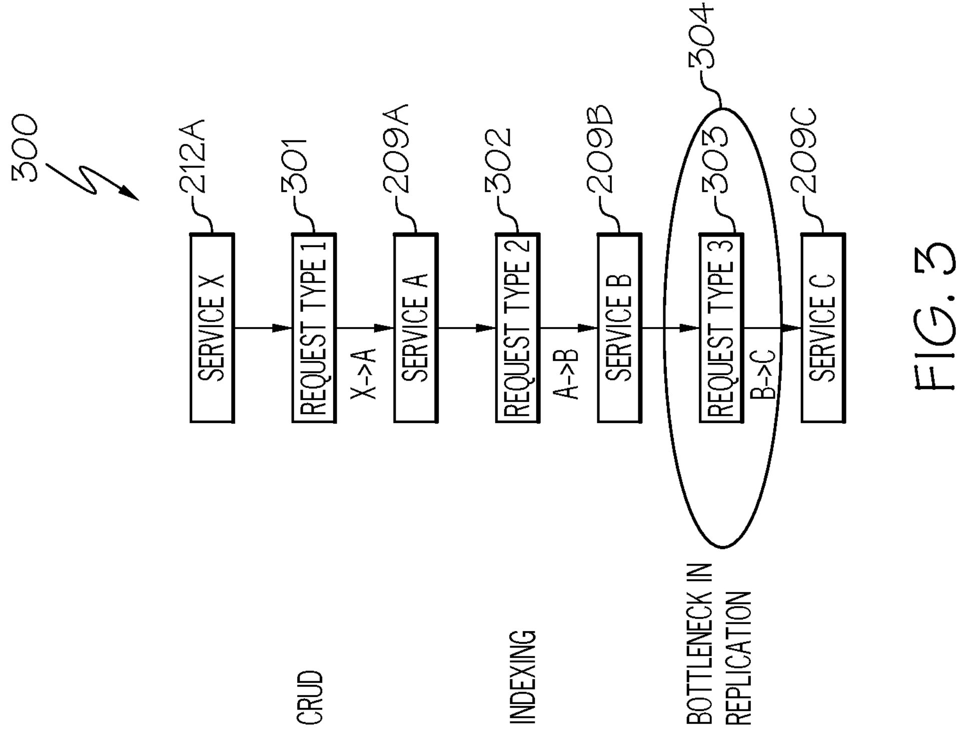
FIG. 3 illustrates a dependency tree in accordance with an embodiment of the present disclosure.

Furthermore, such tracing data 216 is used to generate a dependency tree, such as shown in FIG. 3. A "dependency tree," as used herein, refers to a graph illustrating the relationship between services (e.g., services 209), such as the service pairs handling a particular type of request (e.g., create request, indexing, replication).

In one embodiment, DBaaS component analyzer 219 generates a dependency tree based on analyzing tracing data 216 using various software tools including, but not limited to, SolarWinds® Server and Application Monitor, Dynatrace®, Device42®, Retrace®, ManageEngine® Applications Manager, DataDog®, Extrahop®, AppDynamics®, Pinpoint, etc.

Referring to FIG. 3, FIG. 3 illustrates a dependency tree 300 in accordance with an embodiment of the present disclosure.

As shown in FIG. 3, in conjunction with FIG. 2, dependency tree 300 illustrates the chain of requests that are spawned from an initially received user request. For instance, a CRUD request may be received which automatically generates downstream requests for indexing and replication. Such downstream requests are chained together in dependency tree 300 showing the upstream and downstream relationship. For example, service request 301 of request type 1 may correspond to a create request, which generates a service request 302 of request type 2 (e.g., indexing) and a service request 303 of request type 3 (e.g., replication).

Additionally, as shown in FIG. 3, in conjunction with FIG. 2, dependency tree 300 illustrates the various services handling such request types, and the relationship between such services in terms of service pairs. For example, service X 212A receives a service request 301 of request type 1, which is transferred to service A 209A to handle. As a result, service X 212A and service A 209A form a service pair as identified as "X→A." Furthermore, as shown in FIG. 3, the service request 302 of request type 2 (generated from service request 301) is transferred from service A 209A to service B 209B to handle thereby forming service pair "A→B." Additionally, as shown in FIG. 3, the service request 303 of request type 3 (generated from service request 302) is transferred from service B 209B to service C 209C to handle thereby forming service pair "B→C."

Figure 4:
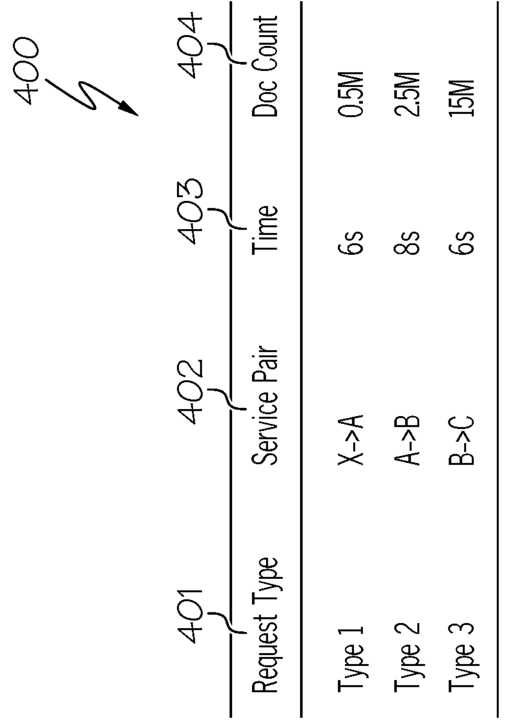
FIG. 4 illustrates a table representing the tracing data that is used for generating the dependency tree of FIG. 3 in accordance with an embodiment of the present disclosure.

Furthermore, tracing data 216 includes the time duration (referred to herein as simply "time") for handling such a service request type and the document count, which may be used for determining a potential bottleneck. For instance, as shown in FIG. 4, FIG. 4 illustrates a table 400 representing the tracing data 216 that is used for generating dependency tree 300 of FIG. 3 in accordance with an embodiment of the present disclosure. As shown in FIG. 4, table 400 includes the various request types 401 (e.g., type 1, type 2, type 3), the service pairs 402 (e.g., X→A"), the time duration 403 for processing such a request and the document count 404 ("Doc Count") corresponding to the number of documents processed during the processing of such a request. For example, as shown in FIG. 4, the service pair ("X→A") processes the request corresponding to request type 1 in 6 seconds involving 0.5 million (0.5M) documents. In another example, the service pair ("A→B") processes the request corresponding to request type 2 in 8 seconds involving 2.5 million (2.5M) documents. In a further example, the service pair ("B→C") processes the request corresponding to request type 3 in 6 seconds involving 15 million (15M) documents.

Returning to FIG. 2, such information may be used by DBaaS component analyzer 219 to identify potential bottlenecks in the DBaaS nodes (e.g., DBaaS node 204) in DBaaS cluster 202. In one embodiment, DBaaS component analyzer 219 identifies such potential bottlenecks based on information found in tracing data 216, such as the time and document count. For example, referring to FIGS. 2-4, DBaaS component analyzer 219 identifies a potential bottleneck 304 in processing service request 303 of type 3 by the service pair "B→C" based on time 403 and/or document count 404 being above or below a threshold level, which may be established by an expert. For example, a potential bottleneck may be established based on the document count exceeding 14 million over a time frame of 6 seconds. In one embodiment, such relationships between time 403 and/or document count 404 corresponding to a potential bottleneck based on exceeding or being less than a threshold level is established by an expert. Such relationships may be stored in a data structure which may be stored in a storage device (e.g., memory, disk unit) of container orchestration system 102. In one embodiment, DBaaS component analyzer 219 accesses the data structure to determine whether a potential bottleneck has been identified in dependency tree 300 using table 400. In one embodiment, DBaaS component analyzer 219 utilizes a software tool for analyzing the data structure to determine whether a potential bottleneck has been identified in dependency tree 300 using the information found in tracing data 216, such as, but not limited to, IBM® Cognos®, Microsoft® Power BI, Sisense®, Thoughtspot, etc.

Furthermore, as shown in FIG. 2, control plane 214 includes a monitor server 220 configured to monitor service requests, such as the service requests received by DBaaS cluster 202. In one embodiment, monitor server 220 utilizes various software tools for monitoring service requests, including, but not limited to, New Relic®, Pixie, Google® Kubernetes Engine, Microsoft® Azure Kubernetes Service, etc.

In one embodiment, monitor server 220 is configured to identify a chain of requests of different types generated from a monitored service request. For example, a CRUD request may be received which automatically generates downstream requests for indexing and replication. Such downstream requests are chained together, such as shown in dependency tree 300 which illustrates the upstream and downstream relationship. For example, service request 301 of request type 1 may correspond to a create request, which generates a service request 302 of request type 2 (e.g., indexing) and a service request 303 of request type 3 (e.g., replication). In one embodiment, monitor server 220 identifies the chain of requests of different types generated from a monitored service request based on dependency tree 300. For example, if monitor server 220 receives service request 301 of type 1, then monitor server 220 identifies a dependency tree 300 which is directed to such a service request, which includes the generated downstream requests that are chained together. In one embodiment, monitor server 220 identifies the appropriate dependency tree 300 based on matching the received service request with the service request at the root of dependency tree 300. In one embodiment, such matching may be accomplished by matching the service request type of the monitored service request with the service request type at the root of dependency tree 300.

Furthermore, in one embodiment, monitor server 220 identifies the services (e.g., services 209) in nodes 204 of DBaaS cluster 202 to handle the chain of requests from dependency tree 300. For example, a service request 301 of request type 1 (e.g., read request) may generate a service request 302 of request type 2 (e.g., indexing) and a service request 303 of request type 3 (e.g., replication), where service pair X→A (services 212A, 209A) handle request type 1, service pair A→B (services 209A, 209B) handle request type 2 and service pair B→C (services 209B, 209C) handle request type 3 as shown in dependency tree 300.

Additionally, control plane 214 includes metrics analyzer 221 configured to analyze various "consumption predictors" for the components (e.g., services 209) of node 204 of DBaaS cluster 202 identified as being a potential bottleneck to determine the utilization of the resources for the components (e.g., services 209) of node 204 of DBaaS cluster 202 identified as being a potential bottleneck.

"Consumption predictors," as used herein, refer to the metrics that are used to predict utilization of the resources for the components of node 204 of DBaaS cluster 202 identified as being a potential bottleneck. For example, such consumption predictors include CPU utilization, memory utilization, disk utilization, input/output utilization, timeline of called components of node 204 of DBaaS cluster 202 identified as being a potential bottleneck, a traffic generation model and the relationship of components of node 204 of DBaaS cluster 202 identified as being a potential bottleneck.

In one embodiment, metrics analyzer 221 analyzes the consumption predictors, such as CPU utilization, memory utilization, disk utilization, and input/output utilization, using various software tools, including, but not limited to, Paessler® PRTG, AIDA64 Extreme, Wise System Monitor, Rainmeter, SolarWind® Network Performance Monitor, etc. Based on such an analysis, the utilization of the resources for the components of node 204 of DBaaS cluster 202 identified as being a potential bottleneck is obtained.

In one embodiment, the timeline of called components of node 204 of DBaaS cluster 202 identified as being a potential bottleneck may be obtained and analyzed by metrics analyzer 221 based on analyzing tracing data 216 which includes the timeline of called components of nodes 204. For example, such tracing data 216 includes the time of components (e.g., services 209) calling each other, such as the time of service 209A calling service 209B, etc. In one embodiment, such information may be traced by tracing server 215 using various software tools, including, but not limited to, Datadog®, Dynatrace®, Retrace®, ContainIQ®, Jaeger, New Relic®, Honeycomb®, etc. In one embodiment, metrics analyzer 221 analyzes such information in tracing data 216 using various software tools, including, but not limited to, Dynatrace®, Device42®, Retrace®, ManageEngine® Applications Manager, Datadog®, Extrahop®, AppDynamics®, Pinpoint, etc. Based on identifying the timeline of the called components of node 204 of DBaaS cluster 202 identified as being a potential bottleneck, metrics analyzer 221 determines the extent of utilization of such components, such as whether such components are being utilized to a great extent within a short period of time.

A "traffic generation model," as used herein, refers to a stochastic model of the packet flow or data sources, such as the traffic flow to DBaaS cluster 202. In one embodiment, such a traffic generation model is created by monitor server 220 using a network traffic generator, such as iperf, bwping and Mausezahn. In one embodiment, such information in the traffic generation model is analyzed by metrics analyzer 221 via various software tools, including, but not limited to, SolarWinds® Network Traffic Analysis Tool, Auvik®, Wireshark®, Nagios®, etc. Based on analyzing the traffic generation model, metrics analyzer 221 determines the extent of utilization of such components, such as whether such components are being utilized to a great extent within a short period of time.

In one embodiment, the traffic generation model is created using the directed traffic of service mesh 217, which controls the flow of traffic between services, into the mesh, and to outside services. In one embodiment, service mesh 217 maintains a service registry of all services in the mesh by name and by their respective endpoints. The registry is maintained to manage the flow of traffic (e.g., pod IP addresses). By using this service registry, and by running the proxies side-by-side with the services, service mesh 217 can direct traffic to the appropriate endpoint. Such directed traffic may be used to generate the traffic generation model.

In one embodiment, the relationship of components of node 204 of DBaaS cluster 202 identified as being a potential bottleneck may be identified based on dependency tree 300, which illustrates how services (e.g., services 209, 212) can be paired. Such information may be obtained by metrics analyzer 221 based on analyzing dependency tree 300, such as via various software tools, including, but not limited to, SAS® Visual Analytics, IBM® SPSS® Modeler, Tibco® Spotfire, etc. Such information may be used to determine the resources of which components need to be analyzed to determine their utilization.

Upon determining the utilization of the resources for the components of node 204 of DBaaS cluster 202 identified as being a potential bottleneck, consumption predictor 222 in control plane 214 predicts future utilization of such resources (e.g., CPU, memory, disk, input/output) based on the current utilization of such resources obtained by metrics analyzer 221 and the timeline of called components of DBaaS cluster 202. In one embodiment, such predicted utilization is based on a machine learning model that is trained to predict the utilization of such resources.

In one embodiment, consumption predictor 222 uses a machine learning algorithm (e.g., supervised learning) to train a machine learning model to predict utilization of a resource, such as a resource used by the components of node 204 of DBaaS cluster 202 identified as being a potential bottleneck, based on the current utilization of the resource and the timeline of called components of DBaaS cluster 202. In one embodiment, such training is based on sample data consisting of past utilization data of the resources provided by metrics analyzer 221 along with tracing data 216 which identifies the timeline of the called out components as well as the number of service requests handled by such components (e.g., services 209) according to such a timeline.

Such sample data is referred to herein as the "training data," which is used by the machine learning algorithm to make predictions or decisions as to the utilization of the resources used by components based on past utilization of the resources in connection with the timeline of the called out components as well as the number of service requests handled by such components (e.g., services 209) according to such a timeline. The algorithm iteratively makes predictions on the training data as to the predicted utilization of the resources until the predictions achieve the desired accuracy as determined by an expert. Examples of such learning algorithms include nearest neighbor, Naïve Bayes, decision trees, linear regression, support vector machines and neural networks.

Figure 5:
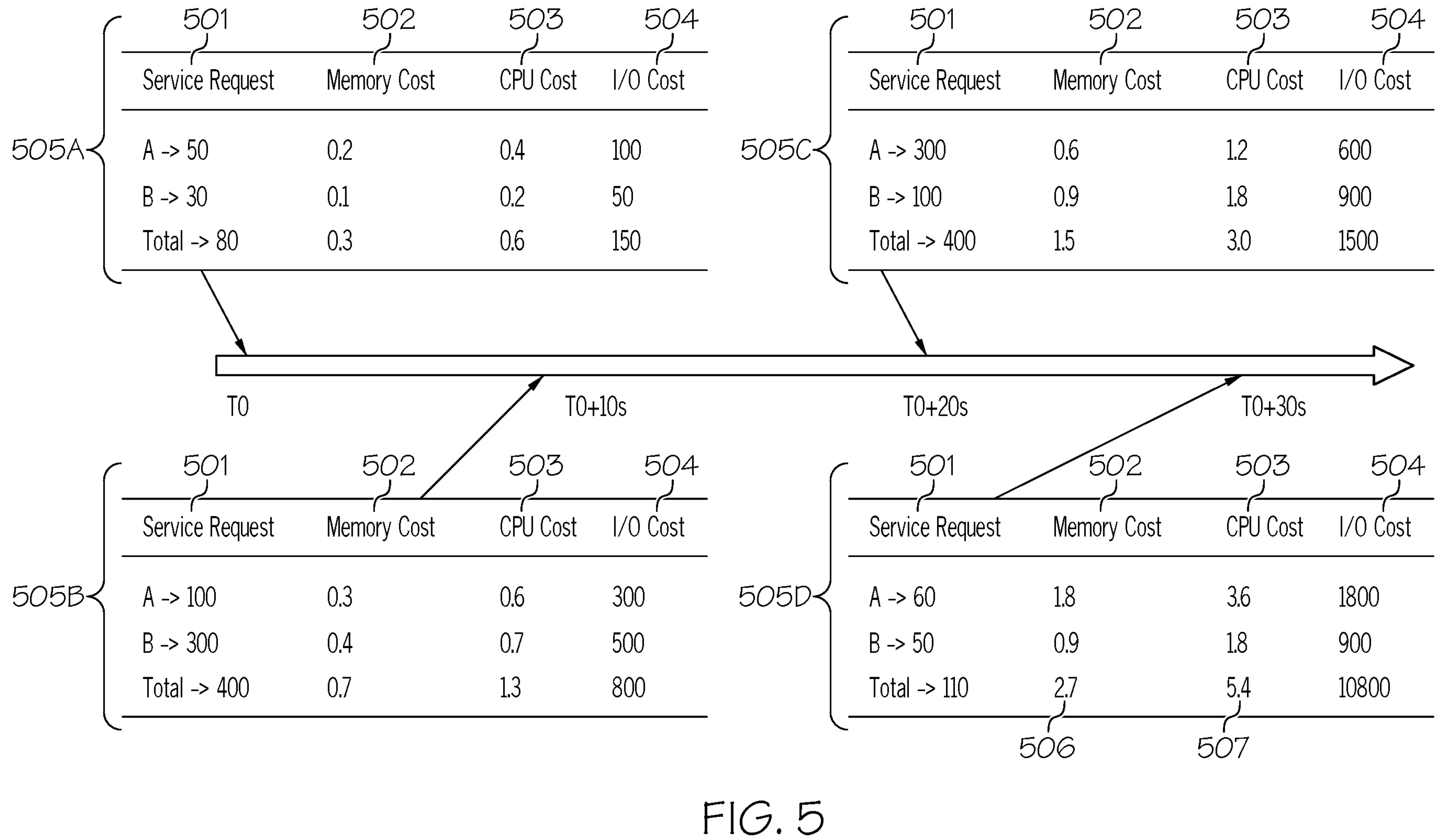
FIG. 5 illustrates the predicted utilization of the DBaaS cluster resources as well as the predicted service requests handled by the components of the DBaaS cluster based on the timeline of called components of the DBaaS cluster in accordance with an embodiment of the present disclosure.

As a result of training the machine learning model to predict the utilization of a resource, such as a resource used by the components of node 204 of DBaaS cluster 202 identified as being a potential bottleneck, based on the timeline of called components of DBaaS cluster 202 as well as the number of service requests handled by such components (e.g., services 209) according to such a timeline, consumption predictor 222 predicts the future utilization of the resources used by the components of node 204 of DBaaS cluster 202 identified as being a potential bottleneck based on the information (the current utilization of resources used by the components of node 204 of DBaaS cluster 202 identified as being a potential bottleneck as well as the timeline of called components of DBaaS cluster 202) provided by metrics analyzer 221 as illustrated in FIG. 5.

FIG. 5 illustrates the predicted utilization of the DBaaS cluster resources (e.g., memory, CPU and input/output (I/O)) as well as the predicted service requests handled by the components (e.g., services 209) of DBaaS cluster 202 based on the timeline of called components of DBaaS cluster 202 in accordance with an embodiment of the present disclosure.

Referring to FIG. 5, in conjunction with FIGS. 1-4, FIG. 5 illustrates the number of service requests, including a particular type, such as type 3 (replication), being processed by service A 209A and service B 209B in column 501 as well as the memory cost (utilization of memory), the CPU cost (utilization of CPU) and I/O cost (utilization of I/O) as shown in columns 502-504, respectively. Such a prediction may be made at various future times, which may be user-designated. For example, table 505A depicts such information (service requests being processed by services A and B and memory, CPU and I/O utilization) at time 0. Table 505B depicts such information (service requests being processed by services A and B and memory, CPU and I/O utilization) at time 0+10 s (10 seconds in the future). Table 505C depicts such information (service requests being processed by services A and B and memory, CPU and I/O utilization) at time 0+20 s (20 seconds in the future). Table 505D depicts such information (service requests being processed by services A and B and memory, CPU and I/O utilization) at time 0+30 s (30 seconds in the future).

In one embodiment, the utilization of memory, CPU and I/O may be scaled. In one embodiment, the utilization of the CPU may correspond to the number of units (e.g., number of CPU units). In one embodiment, the utilization of the CPU may correspond to a fraction of complete utilization of the units. For example, an indication of 1.8 may indicate that 1 unit is completely utilized while a second unit is only 80% utilized. In one embodiment, the utilization of the memory may correspond to the number of gigabytes. In one embodiment, the utilization of I/O may correspond to the number of input/output operations.

Returning to FIG. 2, control plane 214 further includes a tuning controller 223 that is configured to scale one or more pods, such as pods 206 of DBaaS cluster 202, if the predicted utilization of the resources (discussed above) is above or below a threshold level, which may be user-designated. For example, referring to FIG. 5, as shown in table 505D, the memory cost corresponds to a total of 2.7 units (see element 506) and the CPU cost corresponds to a total of 5.4 units (see element 507).

In one embodiment, the utilization of such resources may be compared against a threshold level, which may be user-designated. For example, tuning controller 223 may determine if the memory cost at each of these time periods (e.g., time at 0+10 s, time at 0+20 s, etc.) exceeds a threshold level of 2.5 gigabytes. As shown in table 505D of FIG. 5, the memory cost of 2.7 gigabytes exceeds the threshold level of 2.5 gigabytes at element 506.

In another example, tuning controller 223 may determine if the CPU cost at each of these time periods (e.g., time at 0+10 s, time at 0+20 s, etc.) exceeds a threshold level of 5.0 units. As shown in table 505D of FIG. 5, the CPU cost of 5.4 units exceeds the threshold level of 5.0 units at element 507.

As a result of the predicted utilization of a resource exceeding or being below a threshold level, tuning controller 223 scales the pods, such as pods 206 of DBaaS cluster 202, such as by increasing or decreasing the number of pods 206 in the node 204 of DBaaS cluster 202 identified as being a potential bottleneck. For instance, tuning controller 223 may increase the number of pods 206 of node 204 by a single pod, which is allocated 2 gigabytes of memory and 1 unit of CPU, which addresses the potential deficiency of memory and CPU utilization.

While the foregoing illustrates increasing the number of pods 206 of node 204 identified as being a potential bottleneck, it is noted that the number of pods 206 of node 204 may be decreased, such as when the predicted utilization of a resource is below a threshold level.

In this manner, system bottlenecks at the DBaaS are addressed by identifying potential bottlenecks involving nodes of the DBaaS cluster and intelligently scaling the pod(s) in a node of the DBaaS cluster identified as being a potential bottleneck prior to the bottleneck actually occurring.

A further description of these and other features is provided below in connection with the discussion of the method for intelligently scaling DBaaS resources in a cloud platform.

Prior to the discussion of the method for intelligently scaling DBaaS resources in a cloud platform, a description of the hardware configuration of container orchestration system 102 (FIG. 1) is provided below in connection with FIG. 6.

Figure 6:
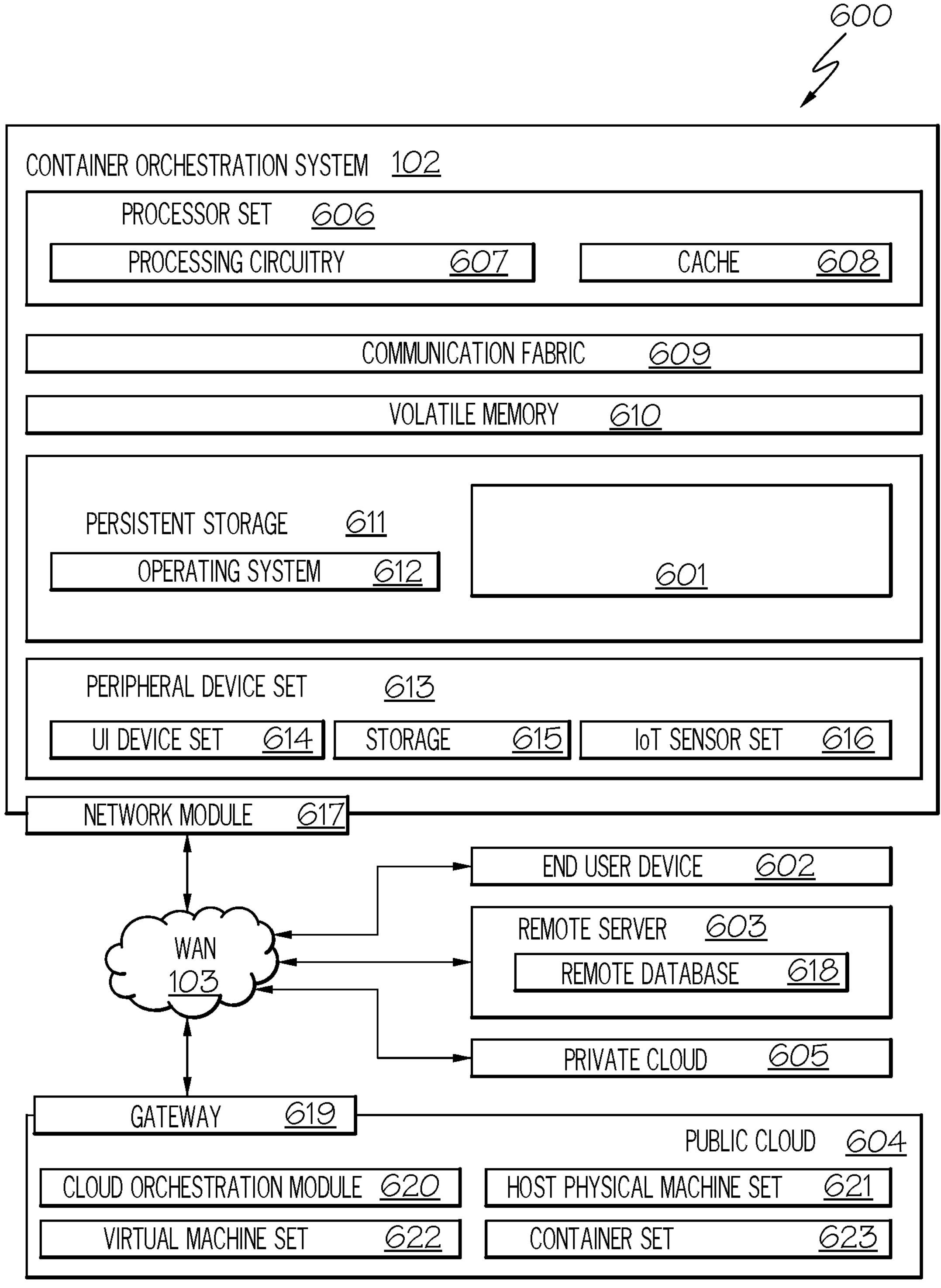
FIG. 6 illustrates an embodiment of the present disclosure of the hardware configuration of the container orchestration system which is representative of a hardware environment for practicing the present disclosure.

Referring now to FIG. 6, in conjunction with FIG. 1, FIG. 6 illustrates an embodiment of the present disclosure of the hardware configuration of container orchestration system 102 which is representative of a hardware environment for practicing the present disclosure.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 600 contains an example of an environment for the execution of at least some of the computer code 601 involved in performing the inventive methods, such as scaling a container resource of a DBaaS cluster in a cloud platform. In addition to block 601, computing environment 600 includes, for example, container orchestration system 102, network 103, such as a wide area network (WAN), end user device (EUD) 602, remote server 603, public cloud 604, and private cloud 605. In this embodiment, container orchestration system 102 includes processor set 606 (including processing circuitry 607 and cache 608), communication fabric 609, volatile memory 610, persistent storage 611 (including operating system 612 and block 601, as identified above), peripheral device set 613 (including user interface (UI) device set 614, storage 615, and Internet of Things (IoT) sensor set 616), and network module 617. Remote server 603 includes remote database 618. Public cloud 604 includes gateway 619, cloud orchestration module 620, host physical machine set 621, virtual machine set 622, and container set 623.

Container orchestration system 102 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 618. As is well understood in the art of computer technology, and depending upon the technology, performance of a computer-implemented method may be distributed among multiple computers and/or between multiple locations. On the other hand, in this presentation of computing environment 600, detailed discussion is focused on a single computer, specifically container orchestration system 102, to keep the presentation as simple as possible. Container orchestration system 102 may be located in a cloud, even though it is not shown in a cloud in FIG. 6. On the other hand, container orchestration system 102 is not required to be in a cloud except to any extent as may be affirmatively indicated.

Processor set 606 includes one, or more, computer processors of any type now known or to be developed in the future. Processing circuitry 607 may be distributed over multiple packages, for example, multiple, coordinated integrated circuit chips. Processing circuitry 607 may implement multiple processor threads and/or multiple processor cores. Cache 608 is memory that is located in the processor chip package(s) and is typically used for data or code that should be available for rapid access by the threads or cores running on processor set 606. Cache memories are typically organized into multiple levels depending upon relative proximity to the processing circuitry. Alternatively, some, or all, of the cache for the processor set may be located "off chip." In some computing environments, processor set 606 may be designed for working with qubits and performing quantum computing.

Computer readable program instructions are typically loaded onto container orchestration system 102 to cause a series of operational steps to be performed by processor set 606 of container orchestration system 102 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 608 and the other storage media discussed below. The program instructions, and associated data, are accessed by processor set 606 to control and direct performance of the inventive methods. In computing environment 600, at least some of the instructions for performing the inventive methods may be stored in block 601 in persistent storage 611.

Communication fabric 609 is the signal conduction paths that allow the various components of container orchestration system 102 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 610 is any type of volatile memory now known or to be developed in the future. Examples include dynamic type random access memory (RAM) or static type RAM. Typically, the volatile memory is characterized by random access, but this is not required unless affirmatively indicated. In container orchestration system 102, the volatile memory 610 is located in a single package and is internal to container orchestration system 102, but, alternatively or additionally, the volatile memory may be distributed over multiple packages and/or located externally with respect to container orchestration system 102.

Persistent Storage 611 is any form of non-volatile storage for computers that is now known or to be developed in the future. The non-volatility of this storage means that the stored data is maintained regardless of whether power is being supplied to container orchestration system 102 and/or directly to persistent storage 611. Persistent storage 611 may be a read only memory (ROM), but typically at least a portion of the persistent storage allows writing of data, deletion of data and re-writing of data. Some familiar forms of persistent storage include magnetic disks and solid state storage devices. Operating system 612 may take several forms, such as various known proprietary operating systems or open source Portable Operating System Interface type operating systems that employ a kernel. The code included in block 601 typically includes at least some of the computer code involved in performing the inventive methods.

Peripheral device set 613 includes the set of peripheral devices of container orchestration system 102. Data communication connections between the peripheral devices and the other components of container orchestration system 102 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 614 may include components such as a display screen, speaker, microphone, wearable devices (such as goggles and smart watches), keyboard, mouse, printer, touchpad, game controllers, and haptic devices. Storage 615 is external storage, such as an external hard drive, or insertable storage, such as an SD card. Storage 615 may be persistent and/or volatile. In some embodiments, storage 615 may take the form of a quantum computing storage device for storing data in the form of qubits. In embodiments where container orchestration system 102 is required to have a large amount of storage (for example, where container orchestration system 102 locally stores and manages a large database) then this storage may be provided by peripheral storage devices designed for storing very large amounts of data, such as a storage area network (SAN) that is shared by multiple, geographically distributed computers. IoT sensor set 616 is made up of sensors that can be used in Internet of Things applications. For example, one sensor may be a thermometer and another sensor may be a motion detector.

Network module 617 is the collection of computer software, hardware, and firmware that allows container orchestration system 102 to communicate with other computers through WAN 103. Network module 617 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 617 are performed on the same physical hardware device. In other embodiments (for example, embodiments that utilize software-defined networking (SDN)), the control functions and the forwarding functions of network module 617 are performed on physically separate devices, such that the control functions manage several different network hardware devices. Computer readable program instructions for performing the inventive methods can typically be downloaded to container orchestration system 102 from an external computer or external storage device through a network adapter card or network interface included in network module 617.

WAN 103 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 602 is any computer system that is used and controlled by an end user (for example, a customer of an enterprise that operates container orchestration system 102), and may take any of the forms discussed above in connection with container orchestration system 102. EUD 602 typically receives helpful and useful data from the operations of container orchestration system 102. For example, in a hypothetical case where container orchestration system 102 is designed to provide a recommendation to an end user, this recommendation would typically be communicated from network module 617 of container orchestration system 102 through WAN 103 to EUD 602. In this way, EUD 602 can display, or otherwise present, the recommendation to an end user. In some embodiments, EUD 602 may be a client device, such as thin client, heavy client, mainframe computer, desktop computer and so on.

Remote server 603 is any computer system that serves at least some data and/or functionality to container orchestration system 102. Remote server 603 may be controlled and used by the same entity that operates container orchestration system 102. Remote server 603 represents the machine(s) that collect and store helpful and useful data for use by other computers, such as container orchestration system 102. For example, in a hypothetical case where container orchestration system 102 is designed and programmed to provide a recommendation based on historical data, then this historical data may be provided to container orchestration system 102 from remote database 618 of remote server 603.

Public cloud 604 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 604 is performed by the computer hardware and/or software of cloud orchestration module 620. The computing resources provided by public cloud 604 are typically implemented by virtual computing environments that run on various computers making up the computers of host physical machine set 621, which is the universe of physical computers in and/or available to public cloud 604. The virtual computing environments (VCEs) typically take the form of virtual machines from virtual machine set 622 and/or containers from container set 623. It is understood that these VCEs may be stored as images and may be transferred among and between the various physical machine hosts, either as images or after instantiation of the VCE. Cloud orchestration module 620 manages the transfer and storage of images, deploys new instantiations of VCEs and manages active instantiations of VCE deployments. Gateway 619 is the collection of computer software, hardware, and firmware that allows public cloud 604 to communicate through WAN 103.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 605 is similar to public cloud 604, except that the computing resources are only available for use by a single enterprise. While private cloud 605 is depicted as being in communication with WAN 103 in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 604 and private cloud 605 are both part of a larger hybrid cloud.

Block 601 further includes the software components discussed above in connection with FIGS. 2-5 to intelligently scale DBaaS resources in a cloud platform. In one embodiment, such components may be implemented in hardware. The functions discussed above performed by such components are not generic computer functions. As a result, container orchestration system 102 is a particular machine that is the result of implementing specific, non-generic computer functions.

In one embodiment, the functionality of such software components of container orchestration system 102, including the functionality for intelligently scaling DBaaS resources in a cloud platform may be embodied in an application specific integrated circuit.

As stated above, the DBaaS cluster may receive various types of requests to be processed. For example, the DBaaS cluster may receive a create, read, update or delete request to be processed. Such a request (create, read, update or delete requests are collectively referred to as a "CRUD" request) though may automatically generate numerous downstream requests, such as for indexing and replication. For example, the CRUD request may generate downstream requests for indexing and replication which are processed by the containers of the pods in the DBaaS cluster. For instance, the containers of a particular pod may be utilized to process the downstream requests for indexing and the containers of another particular pod may be utilized to process the downstream requests for replication. As a result of a request being converted into multiple requests with upstream and downstream relationships, the DBaaS cluster may not be able to service such requests in an efficient manner thereby resulting in a system bottleneck which negatively impacts system performance. A "system bottleneck," as used herein, refers to an overloaded system in which components of the system, such as the DBaaS cluster, are unable to keep pace with the system thereby slowing overall performance. Unfortunately, the scaling mechanism discussed above, such as horizontal scaling by a horizontal pod autoscaler, is only able to address such a system bottleneck after the problem has impacted system performance. For example, such scaling occurs after the observed metrics, such as memory and CPU performance, has indicated that scaling is necessary. As a result, the scaling mechanism discussed above does not address such a system bottleneck since the DBaaS throughput cannot be changed in time in the cloud platform.

Figure 7:
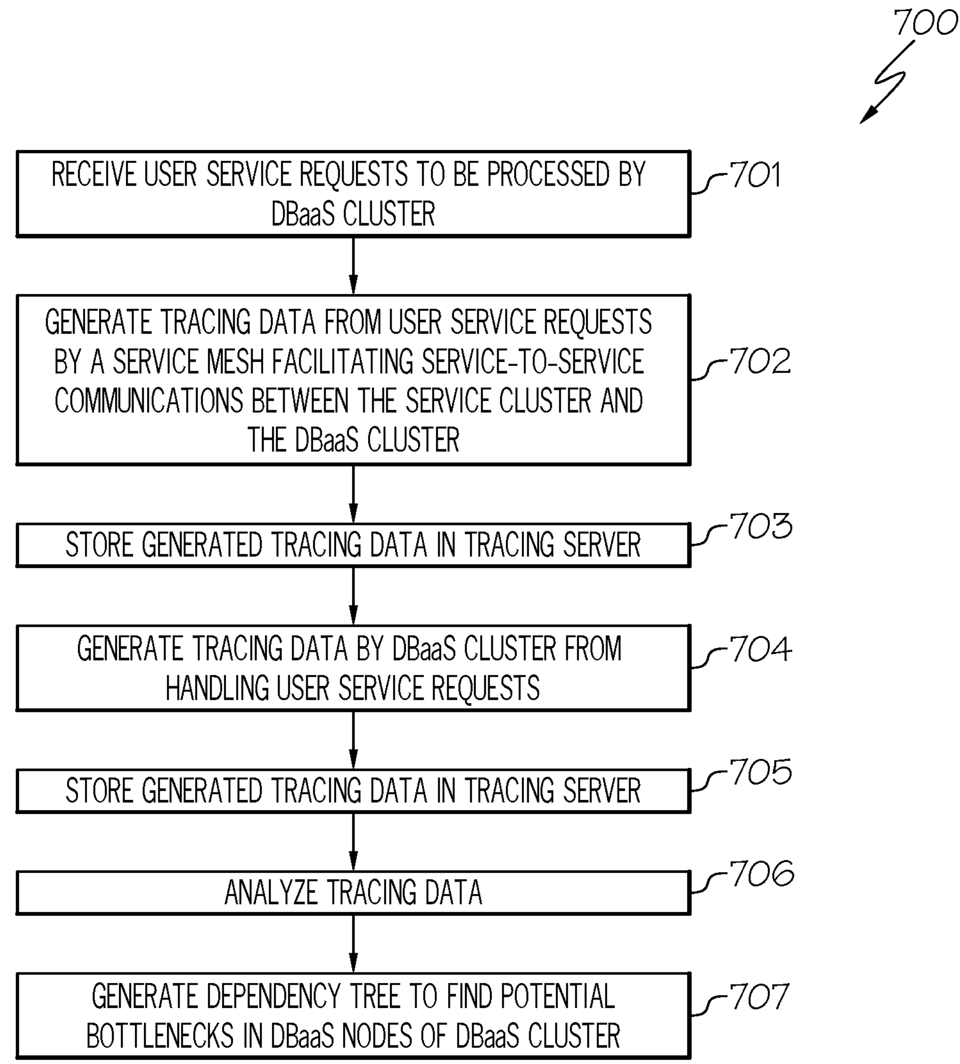
FIG. 7 is a flowchart of a method for generating a dependency tree to find potential bottlenecks in the DBaaS nodes of the DBaaS cluster in accordance with an embodiment of the present disclosure.
Figure 8:
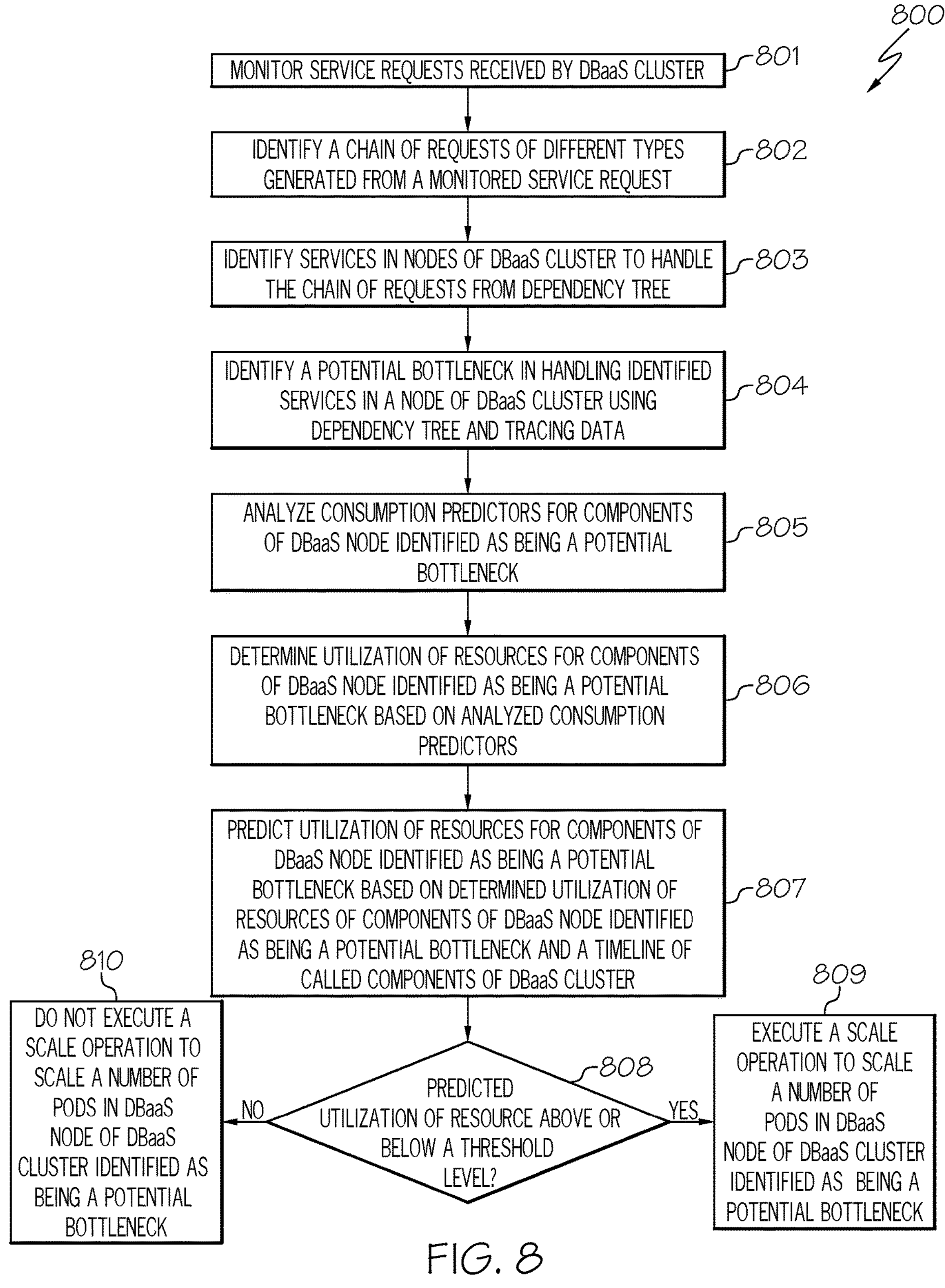
FIG. 8 is a flowchart of a method for scaling the pods in the DBaaS nodes of the DBaaS cluster identified as being potential bottlenecks in accordance with an embodiment of the present disclosure.

The embodiments of the present disclosure provide a means for addressing system bottlenecks at the DBaaS by identifying potential bottlenecks involving nodes of the DBaaS cluster and intelligently scaling the pods in a node of the DBaaS cluster identified as being a potential bottleneck prior to the bottleneck actually occurring as discussed below in connection with FIGS. 7-8. FIG. 7 is a flowchart of a method for generating a dependency tree to find potential bottlenecks in the DBaaS nodes of the DBaaS cluster. FIG. 8 is a flowchart of a method for scaling the pods in the DBaaS nodes of the DBaaS cluster identified as being potential bottlenecks.

As stated above, FIG. 7 is a flowchart of a method 700 for generating a dependency tree to find potential bottlenecks in the DBaaS nodes of the DBaaS cluster in accordance with an embodiment of the present disclosure.

Referring to FIG. 7, in conjunction with FIGS. 1-6, in operation 701, ingress gateway 213 receives user service requests to be processed by DBaaS cluster 202. As discussed above, ingress gateway 213 receives service requests issued by a user, such as a user of computing device 101. Such service requests may then be forwarded to a sidecar 211 which invokes a DBaaS service to handle such a service request.

In operation 702, service mesh 217 generates tracing data 216 (first set of tracing data) from the user service requests.

As discussed above, in one embodiment, tracing data 216 may be obtained from a service mesh 217 that facilitates service-to-service communication between service cluster 203 and DBaaS cluster 202. In one embodiment, service mesh 217 controls how different parts of an application share data with one another. In one embodiment, service mesh 217 corresponds to a dedicated infrastructure layer for facilitating service-to-service communications between services or microservices, using a proxy. In one embodiment, service mesh 217 consists of network proxies paired with each service in an application and a set of task management processed. The proxies are called the "data plane" 201 and the management processes are called the "control plane" 214. In one embodiment, data plane 201 intercepts calls between different services and processes them; whereas, control plane 214 coordinates the behavior of proxies and provides APIs for operations and maintenance. In one embodiment, the service mesh architecture is implemented using various software tools including, but not limited to, Istio®, Linkerd®, Consul®, Traefik Mesh®, etc.

In one embodiment, service mesh 217 generates tracing data 216 by generating distributed traces spans for each service within it (see lines from sidecars 208, 211 to tracing data 216 as shown in FIG. 2). Such traces can be used to follow a single request (user service request received by ingress gateway 213) through the mesh across multiple services and proxies.

In operation 703, service mesh 217 stores the generated tracing data 216 (generated in operation 702) in tracing server 215.

In operation 704, DBaaS cluster 202 generates tracing data 216 (second set of tracing data) from handling the user service requests.

As discussed above, in one embodiment, DBaaS cluster 202 utilizes a distributed tracing tool 218 for obtaining tracing data 216 from DBaaS cluster 202 handling the user service requests. In one embodiment, distributed tracing tool 218 may perform distributed tracing using various software tools, including, but not limited to, SigNoz®, Jaeger, Zipkin, Dynatrace®, New Relic®, Honeycomb®, Lightstep®, Instana®, DataDog®, Splunk®, etc.

In operation 705, distributed tracing tool 218 stores the generated tracing data 216 (generated in operation 704) in tracing server 215.

In operation 706, DBaaS component analyzer 219 analyzes tracing data 216.

In operation 707, DBaaS component analyzer 219 generates a dependency tree, such as dependency tree 300, to find potential bottlenecks in DBaaS nodes 204 of DBaaS cluster 202 based on analyzing tracing data 216.

As discussed above, in one embodiment, DBaaS component analyzer 219 generates a dependency tree, such as dependency tree 300, based on analyzing tracing data 216 using various software tools including, but not limited to, SolarWinds® Server and Application Monitor, Dynatrace®, Device42®, Retrace®, ManageEngine® Applications Manager, DataDog®, Extrahop®, AppDynamics®, Pinpoint, etc.

An illustration of such a dependency tree 300 is shown in FIG. 3.

As shown in FIG. 3, in conjunction with FIG. 2, dependency tree 300 illustrates the chain of requests that are spawned from an initially received user request. For instance, a CRUD request may be received which automatically generates downstream requests for indexing and replication. Such downstream requests are chained together in dependency tree 300 showing the upstream and downstream relationship. For example, service request 301 of request type 1 may correspond to a create request, which generates a service request 302 of request type 2 (e.g., indexing) and a service request 303 of request type 3 (e.g., replication).

Additionally, as shown in FIG. 3, in conjunction with FIG. 2, dependency tree 300 illustrates the various services handling such request types, and the relationship between such services in terms of service pairs. For example, service X 212A receives a service request 301 of request type 1, which is transferred to service A 209A to handle. As a result, service X 212A and service A 209A form a service pair as identified as "X→A." Furthermore, as shown in FIG. 3, the service request 302 of request type 2 (generated from service request 301) is transferred from service A 209A to service B 209B to handle thereby forming service pair "A→B." Additionally, as shown in FIG. 3, the service request 303 of request type 3 (generated from service request 302) is transferred from service B 209B to service C 209C to handle thereby forming service pair "B→C."

Furthermore, tracing data 216 includes the time duration (referred to herein as simply "time") for handling such a service request type and the document count, which may be used for determining a potential bottleneck. For instance, as shown in FIG. 4, FIG. 4 illustrates a table 400 representing the tracing data 216 that is used for generating dependency tree 300 of FIG. 3 in accordance with an embodiment of the present disclosure. As shown in FIG. 4, table 400 includes the various request types 401 (e.g., type 1, type 2, type 3), the service pairs 402 (e.g., X→A"), the time duration 403 for processing such a request and the document count 404 ("Doc Count") corresponding to the number of documents processed during the processing of such a request. For example, as shown in FIG. 4, the service pair ("X→A") processes the request corresponding to request type 1 in 6 seconds involving 0.5 million (0.5M) documents. In another example, the service pair ("A→B") processes the request corresponding to request type 2 in 8 seconds involving 2.5 million (2.5M) documents. In a further example, the service pair ("B→C") processes the request corresponding to request type 3 in 6 seconds involving 15 million (15M) documents.

Such information may be used by DBaaS component analyzer 219 to identify potential bottlenecks in the DBaaS nodes (e.g., DBaaS node 204) in DBaaS cluster 202. In one embodiment, DBaaS component analyzer 219 identifies such potential bottlenecks based on information found in tracing data 216, such as the time and document count. For example, DBaaS component analyzer 219 identifies a potential bottleneck 304 in processing service request 303 of type 3 by the service pair "B→C" based on time 403 and/or document count 404 being above or below a threshold level, which may be established by an expert. For example, a potential bottleneck may be established based on the document count exceeding 14 million over a time frame of 6 seconds. In one embodiment, such relationships between time 403 and/or document count 404 corresponding to a potential bottleneck based on exceeding or being less than a threshold level is established by an expert. Such relationships may be stored in a data structure which may be stored in a storage device (e.g., storage device 611, 615) of container orchestration system 102. In one embodiment, DBaaS component analyzer 219 accesses the data structure to determine whether a potential bottleneck has been identified in dependency tree 300 using table 400. In one embodiment, DBaaS component analyzer 219 utilizes a software tool for analyzing the data structure to determine whether a potential bottleneck has been identified in dependency tree 300 using the information found in tracing data 216, such as, but not limited to, IBM® Cognos®, Microsoft® Power BI, Sisense®, Thoughtspot, etc.

Upon generating dependency tree 300, pods 206 in DBaaS cluster 202 may be scaled (scaled up or down) in order to address potential bottlenecks as discussed below in connection with FIG. 8.

FIG. 8 is a flowchart of a method 800 for scaling pods 206 in DBaaS nodes 204 of DBaaS cluster 202 identified as being potential bottlenecks in accordance with an embodiment of the present disclosure.

Referring to FIG. 8, in conjunction with FIGS. 1-7, in operation 801, monitor server 220 monitors the service requests received by DBaaS cluster 202.

As discussed above, in one embodiment, monitor server 220 utilizes various software tools for monitoring service requests, including, but not limited to, New Relic®, Pixie, Google® Kubernetes Engine, Microsoft® Azure Kubernetes Service, etc.

In operation 802, monitor server 220 identifies a chain of requests of different types generated from a monitored service request.

For example, a CRUD request may be received which automatically generates downstream requests for indexing and replication. Such downstream requests are chained together, such as shown in dependency tree 300 which illustrates the upstream and downstream relationship. For example, service request 301 of request type 1 may correspond to a create request, which generates a service request 302 of request type 2 (e.g., indexing) and a service request 303 of request type 3 (e.g., replication). In one embodiment, monitor server 220 identifies the chain of requests of different types generated from a monitored service request based on dependency tree 300. For example, if monitor server 220 receives service request 301 of type 1, then monitor server 220 identifies a dependency tree 300 which is directed to such a service request, which includes the generated downstream requests that are chained together. In one embodiment, monitor server 220 identifies the appropriate dependency tree 300 based on matching the received service request with the service request at the root of dependency tree 300. In one embodiment, such matching may be accomplished by matching the service request type of the monitored service request with the service request type at the root of dependency tree 300.

In operation 803, monitor server 220 identifies the services (e.g., services 209) in nodes 204 of DBaaS cluster 202 to handle the chain of requests from dependency tree 300.

For example, as shown in FIG. 3, a service request 301 of request type 1 (e.g., read request) may generate a service request 302 of request type 2 (e.g., indexing) and a service request 303 of request type 3 (e.g., replication), where service pair X→A (services 212A, 209A) handle request type 1, service pair A→B (services 209A, 209B) handle request type 2 and service pair B→C (services 209B, 209C) handle request type 3 as shown in dependency tree 300.

In operation 804, DBaaS component analyzer 219 identifies a potential bottleneck in handling the identified services in a node 204 of DBaaS cluster 202 using dependency tree 300 and tracing data 216.

As discussed above, in one embodiment, DBaaS component analyzer 219 identifies such potential bottlenecks based on information found in tracing data 216, such as the time and document count, in connection with dependency tree 300. For example, referring to FIGS. 2-4, DBaaS component analyzer 219 identifies a potential bottleneck 304 in processing service request 303 of type 3 by the service pair "B→C" based on time 403 and/or document count 404 being above or below a threshold level, which may be established by an expert. For example, a potential bottleneck may be established based on the document count exceeding 14 million over a time frame of 6 seconds. In one embodiment, such relationships between time 403 and/or document count 404 corresponding to a potential bottleneck based on exceeding or being less than a threshold level is established by an expert. Such relationships may be stored in a data structure which may be stored in a storage device (e.g., storage device 611, 615) of container orchestration system 102. In one embodiment, DBaaS component analyzer 219 accesses the data structure to determine whether a potential bottleneck has been identified in dependency tree 300 using table 400. In one embodiment, DBaaS component analyzer 219 utilizes a software tool for analyzing the data structure to determine whether a potential bottleneck has been identified in dependency tree 300 using the information found in tracing data 216, such as, but not limited to, IBM® Cognos®, Microsoft® Power BI, Sisense®, Thoughtspot, etc.

In operation 805, metrics analyzer 221 analyzes consumption predictors for the components (e.g., services 209) of DBaaS node 204 of DBaaS cluster 202 identified as being a potential bottleneck.

In operation 806, metrics analyzer 221 determines the utilization of the resources for the components (e.g., services 209) of DBaaS node 204 of DBaaS cluster 202 identified as being a potential bottleneck based on the analyzed consumption predictors.

As discussed above, "consumption predictors," as used herein, refer to the metrics that are used to predict utilization of the resources for the components of node 204 of DBaaS cluster 202 identified as being a potential bottleneck. For example, such consumption predictors include CPU utilization, memory utilization, disk utilization, input/output utilization, timeline of called components of node 204 of DBaaS cluster 202 identified as being a potential bottleneck, a traffic generation model and the relationship of components of node 204 of DBaaS cluster 202 identified as being a potential bottleneck.

In one embodiment, metrics analyzer 221 analyzes the consumption predictors, such as CPU utilization, memory utilization, disk utilization, and input/output utilization, using various software tools, including, but not limited to, Paessler® PRTG, AIDA64 Extreme, Wise System Monitor, Rainmeter, SolarWind® Network Performance Monitor, etc. Based on such an analysis, the utilization of the resources for the components of node 204 of DBaaS cluster 202 identified as being a potential bottleneck is obtained.

In one embodiment, the timeline of called components of node 204 of DBaaS cluster 202 identified as being a potential bottleneck may be obtained and analyzed by metrics analyzer 221 based on analyzing tracing data 216 which includes the timeline of called components of nodes 204. For example, such tracing data 216 includes the time of components (e.g., services 209) calling each other, such as the time of service 209A calling service 209B, etc. In one embodiment, such information may be traced by tracing server 215 using various software tools, including, but not limited to, Datadog®, Dynatrace®, Retrace®, ContainIQ®, Jaeger, New Relic®, Honeycomb®, etc. In one embodiment, metrics analyzer 221 analyzes such information in tracing data 216 using various software tools, including, but not limited to, Dynatrace®, Device42®, Retrace®, ManageEngine® Applications Manager, Datadog®, Extrahop®, AppDynamics®, Pinpoint, etc. Based on identifying the timeline of the called components of node 204 of DBaaS cluster 202 identified as being a potential bottleneck, metrics analyzer 221 determines the extent of utilization of such components, such as whether such components are being utilized to a great extent within a short period of time.

A "traffic generation model," as used herein, refers to a stochastic model of the packet flow or data sources, such as the traffic flow to DBaaS cluster 202. In one embodiment, such a traffic generation model is created by monitor server 220 using a network traffic generator, such as iperf, bwping and Mausezahn. In one embodiment, such information in the traffic generation model is analyzed by metrics analyzer 221 via various software tools, including, but not limited to, SolarWinds® Network Traffic Analysis Tool, Auvik®, Wireshark®, Nagios®, etc. Based on analyzing the traffic generation model, metrics analyzer 221 determines the extent of utilization of such components, such as whether such components are being utilized to a great extent within a short period of time.

In one embodiment, the traffic generation model is created using the directed traffic of service mesh 217, which controls the flow of traffic between services, into the mesh, and to outside services. In one embodiment, service mesh 217 maintains a service registry of all services in the mesh by name and by their respective endpoints. The registry is maintained to manage the flow of traffic (e.g., pod IP addresses). By using this service registry, and by running the proxies side-by-side with the services, service mesh 217 can direct traffic to the appropriate endpoint. Such directed traffic may be used to generate the traffic generation model.

In one embodiment, the relationship of components of node 204 of DBaaS cluster 202 identified as being a potential bottleneck may be identified based on dependency tree 300, which illustrates how services (e.g., services 209, 212) can be paired. Such information may be obtained by metrics analyzer 221 based on analyzing dependency tree 300, such as via various software tools, including, but not limited to, SAS® Visual Analytics, IBM® SPSS® Modeler, Tibco® Spotfire, etc. Such information may be used to determine the resources of which components need to be analyzed to determine their utilization.

In operation 807, upon determining the utilization of the resources for the components of node 204 of DBaaS cluster 202 identified as being a potential bottleneck, consumption predictor 222 predicts the utilization of resources for the components (e.g., services 209) of DBaaS node 204 of DBaaS cluster 202 identified as being a potential bottleneck based on the determined utilization of such resources obtained by metrics analyzer 221 in operation 806 and the timeline of called components of DBaaS cluster 202.

As stated above, in one embodiment, such predicted utilization is based on a machine learning model that is trained to predict the utilization of such resources.

In one embodiment, consumption predictor 222 uses a machine learning algorithm (e.g., supervised learning) to train a machine learning model to predict utilization of a resource, such as a resource used by the components of node 204 of DBaaS cluster 202 identified as being a potential bottleneck, based on the current utilization of the resource and the timeline of called components of DBaaS cluster 202. In one embodiment, such training is based on sample data consisting of past utilization data of the resources provided by metrics analyzer 221 along with tracing data 216 which identifies the timeline of the called out components as well as the number of service requests handled by such components (e.g., services 209) according to such a timeline.

Such sample data is referred to herein as the "training data," which is used by the machine learning algorithm to make predictions or decisions as to the utilization of the resources used by components based on past utilization of the resources in connection with the timeline of the called out components as well as the number of service requests handled by such components (e.g., services 209) according to such a timeline. The algorithm iteratively makes predictions on the training data as to the predicted utilization of the resources until the predictions achieve the desired accuracy as determined by an expert. Examples of such learning algorithms include nearest neighbor, Naïve Bayes, decision trees, linear regression, support vector machines and neural networks.

As a result of training the machine learning model to predict the utilization of a resource, such as a resource used by the components of node 204 of DBaaS cluster 202 identified as being a potential bottleneck, based on the timeline of called components of DBaaS cluster 202 as well as the number of service requests handled by such components (e.g., services 209) according to such a timeline, consumption predictor 222 predicts the future utilization of the resources used by the components of node 204 of DBaaS cluster 202 identified as being a potential bottleneck based on the information (the current utilization of resources used by the components of node 204 of DBaaS cluster 202 identified as being a potential bottleneck as well as the timeline of called components of DBaaS cluster 202) provided by metrics analyzer 221 as illustrated in FIG. 5.

FIG. 5 illustrates the predicted utilization of the DBaaS cluster resources (e.g., memory, CPU and input/output (I/O)) as well as the predicted service requests handled by the components (e.g., services 209) of DBaaS cluster 202 based on the timeline of called components of DBaaS cluster 202 in accordance with an embodiment of the present disclosure.

Referring to FIG. 5, in conjunction with FIGS. 1-4, FIG. 5 illustrates the number of service requests, including a particular type, such as type 3 (replication), being processed by service A 209A and service B 209B in column 501 as well as the memory cost (utilization of memory), the CPU cost (utilization of CPU) and I/O cost (utilization of I/O) as shown in columns 502-504, respectively. Such a prediction may be made at various future times, which may be user-designated. For example, table 505A depicts such information (service requests being processed by services A and B and memory, CPU and I/O utilization) at time 0. Table 505B depicts such information (service requests being processed by services A and B and memory, CPU and I/O utilization) at time 0+10 s (10 seconds in the future). Table 505C depicts such information (service requests being processed by services A and B and memory, CPU and I/O utilization) at time 0+20 s (20 seconds in the future). Table 505D depicts such information (service requests being processed by services A and B and memory, CPU and I/O utilization) at time 0+30 s (30 seconds in the future).

In one embodiment, the utilization of memory, CPU and I/O may be scaled. In one embodiment, the utilization of the CPU may correspond to the number of units (e.g., number of CPU units). In one embodiment, the utilization of the CPU may correspond to a fraction of complete utilization of the units. For example, an indication of 1.8 may indicate that 1 unit is completely utilized while a second unit is only 80% utilized. In one embodiment, the utilization of the memory may correspond to the number of gigabytes. In one embodiment, the utilization of I/O may correspond to the number of input/output operations.

In operation 808, tuning controller 223 determines if the predicted utilization of a resource for a component (e.g., service 209) of DBaaS node 204 identified as being a potential bottleneck is above or below a threshold level, which may be user-designated.

If the predicted utilization of a resource exceeds a threshold level, then, in operation 809, tuning controller 223 executes a scale operation to scale (increase or decrease) the number of pods 206 in DBaaS node 204 identified as being a potential bottleneck.

For example, referring to FIG. 5, as shown in table 505D, the memory cost corresponds to a total of 2.7 units (see element 506) and the CPU cost corresponds to a total of 5.4 units (see element 507).

In one embodiment, the utilization of such resources may be compared against a threshold level, which may be user-designated. For example, tuning controller 223 may determine if the memory cost at each of these time periods (e.g., time at 0+10 s, time at 0+20 s, etc.) exceeds a threshold level of 2.5 gigabytes. As shown in table 505D of FIG. 5, the memory cost of 2.7 gigabytes exceeds the threshold level of 2.5 gigabytes at element 506.

In another example, tuning controller 223 may determine if the CPU cost at each of these time periods (e.g., time at 0+10 s, time at 0+20 s, etc.) exceeds a threshold level of 5.0 units. As shown in table 505D of FIG. 5, the CPU cost of 5.4 units exceeds the threshold level of 5.0 units at element 507.

As a result of the predicted utilization of a resource exceeding or being below a threshold level, tuning controller 223 scales the pods, such as pods 206 of DBaaS cluster 202, such as by increasing or decreasing the number of pods 206 in the node 204 of DBaaS cluster 202 identified as being a potential bottleneck. For instance, tuning controller 223 may increase the number of pods 206 of node 204 by a single pod, which is allocated 2 gigabytes of memory and 1 unit of CPU, which addresses the potential deficiency of memory and CPU utilization.

In this manner, system bottlenecks at the DBaaS are addressed by identifying potential bottlenecks involving nodes of the DBaaS cluster and intelligently scaling the pod(s) in a node of the DBaaS cluster identified as being a potential bottleneck prior to the bottleneck actually occurring.

If, however, the predicted utilization of a resource is not above or below a threshold level, then, in operation 810, tuning controller 223 does not execute a scale operation to scale (increase or decrease) the number of pods 206 in DBaaS node 204 identified as being a potential bottleneck.

As a result of the foregoing, embodiments of the present disclosure dynamically tune DBaaS performance in the cloud platform. Furthermore, embodiments of the present disclosure resolve the limitation of the DBaaS throughput not being able to be changed in time in the cloud platform when a bottleneck occurs in the DBaaS cluster.

Furthermore, the principles of the present disclosure improve the technology or technical field involving Database as a Service (DBaaS). As discussed above, the DBaaS cluster may receive various types of requests to be processed. For example, the DBaaS cluster may receive a create, read, update or delete request to be processed. Such a request (create, read, update or delete requests are collectively referred to as a "CRUD" request) though may automatically generate numerous downstream requests, such as for indexing and replication. For example, the CRUD request may generate downstream requests for indexing and replication which are processed by the containers of the pods in the DBaaS cluster. For instance, the containers of a particular pod may be utilized to process the downstream requests for indexing and the containers of another particular pod may be utilized to process the downstream requests for replication. As a result of a request being converted into multiple requests with upstream and downstream relationships, the DBaaS cluster may not be able to service such requests in an efficient manner thereby resulting in a system bottleneck which negatively impacts system performance. A "system bottleneck," as used herein, refers to an overloaded system in which components of the system, such as the DBaaS cluster, are unable to keep pace with the system thereby slowing overall performance. Unfortunately, the scaling mechanism discussed above, such as horizontal scaling by a horizontal pod autoscaler, is only able to address such a system bottleneck after the problem has impacted system performance. For example, such scaling occurs after the observed metrics, such as memory and CPU performance, has indicated that scaling is necessary. As a result, the scaling mechanism discussed above does not address such a system bottleneck since the DBaaS throughput cannot be changed in time in the cloud platform.

Embodiments of the present disclosure improve such technology by receiving user service requests from a service cluster to be processed by the DBaaS cluster. A "service cluster," as used herein, refers to a cluster of nodes for receiving and forwarding service requests to the DBaaS cluster. A "DBaaS cluster," as used herein, refers to a cluster of nodes for handling such service requests. For example, an ingress gateway of the service cluster may receive and forward such requests to a sidecar which invokes a DBaaS service to handle such a service request. The DBaaS cluster and the service cluster each consists of a set of worker machines, called nodes, that run containerized applications (containerized applications package an application with its dependencies and necessary services). Each of the nodes may include one or more pods containing a group of one or more containers. A "container," as used herein, refers to a standard unit of software that packages up code and all its dependencies so that the application runs quickly and reliably from one computing environment to another. A first set of tracing data from the user service requests is generated by a service mesh facilitating service-to-service communication between the service cluster and the DBaaS cluster. A second set of tracing data is generated by the DBaaS cluster from handling the user service requests. Such tracing data (both first and second sets) illustrates how the service components of a node of a DBaaS cluster operate, execute and perform in handling service requests. A dependency tree is then generated to discover application relationships to identify potential bottlenecks in nodes of the DBaaS cluster based on the first and second sets of tracing data. A "dependency tree," as used herein, refers to a graph illustrating the relationship between the services, such as the service pairs handling a particular type of request (e.g., create request, indexing, replication). One or more pods of a node of the DBaaS cluster are then scaled (scaled up or down) based on the dependency tree, which is used in part, to predict the utilization of the resources of the components of the DBaaS node identified as being a potential bottleneck. When the predicted utilization of the resources is above or below a threshold level, a scale operation is executed to scale the pod(s) of the DBaaS node identified as being a potential bottleneck. In this manner, system bottlenecks at the DBaaS are addressed by identifying potential bottlenecks involving nodes of the DBaaS cluster and intelligently scaling the pod(s) in a node of the DBaaS cluster identified as being a potential bottleneck prior to the bottleneck actually occurring. Furthermore, in this manner, there is an improvement in the technical field involving Database as a Service (DBaaS).

The technical solution provided by the present disclosure cannot be performed in the human mind or by a human using a pen and paper. That is, the technical solution provided by the present disclosure could not be accomplished in the human mind or by a human using a pen and paper in any reasonable amount of time and with any reasonable expectation of accuracy without the use of a computer.

In one embodiment of the present disclosure, a computer-implemented method for scaling a resource of a Database as a Service (DBaaS) cluster in a cloud platform comprises receiving user service requests from a service cluster to be processed by the DBaaS cluster, where the DBaaS cluster comprises one or more nodes, and where each of the one or more nodes comprises one or more pods containing a group of one or more containers. The method further comprises generating a first set of tracing data from the user service requests by a service mesh facilitating service-to-service communication between the service cluster and the DBaaS cluster. The method additionally comprises generating a second set of tracing data by the DBaaS cluster from handling the user service requests. Furthermore, the method comprises generating a dependency tree to discover application relationships to identify potential bottlenecks in nodes of the DBaaS cluster based on the first and second sets of tracing data. Additionally, the method comprises scaling one or more pods of a node of the DBaaS cluster based on the dependency tree.

Furthermore, in one embodiment of the present disclosure, the method additionally comprises analyzing the first and second sets of tracing data. The method further comprises generating the dependency tree based on the analyzing of the first and second sets of tracing data.

Additionally, in one embodiment of the present disclosure, the method further comprises monitoring service requests received by the DBaaS cluster. The method additionally comprises identifying a chain of requests of different types generated from a monitored service request. Furthermore, the method comprises identifying services in nodes of the DBaaS cluster to handle the chain of requests from the dependency tree.

Furthermore, in one embodiment of the present disclosure, the method additionally comprises identifying a potential bottleneck in handling the identified services in a node of the DBaaS cluster using the dependency tree and the first and second sets of tracing data.

Additionally, in one embodiment of the present disclosure, the method further comprises analyzing consumption predictors for components of the node of the DBaaS cluster identified as being the potential bottleneck. The method additionally comprises determining utilization of resources for the components of the node of the DBaaS cluster identified as being the potential bottleneck based on the analyzed consumption predictors.

Furthermore, in one embodiment of the present disclosure, the method additionally comprises predicting utilization of resources for the components of the node of the DBaaS cluster identified as being the potential bottleneck based on the determined utilization of resources for the components of the node of the DBaaS cluster identified as being the potential bottleneck and a timeline of called components of the DBaaS cluster. The method further comprises executing a scale operation to scale a number of the one or more pods in the node of the DBaaS cluster identified as being the potential bottleneck in response to the predicted utilization of resources being above or below a threshold level.

Additionally, in one embodiment of the present disclosure, the method further comprises having the consumption predictors comprise one or more of the following: CPU utilization, memory utilization, disk utilization, input/output utilization, timeline of called components of the node of the DBaaS cluster identified as being the potential bottleneck, a traffic generation model and relationship of components of the node of the DBaaS cluster identified as being the potential bottleneck.

Other forms of the embodiments of the computer-implemented method described above are in a system and in a computer program product.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A computer-implemented method for scaling a resource of a Database as a Service (DBaaS) cluster in a cloud platform, the method comprising:

receiving user service requests from a service cluster to be processed by said DBaaS cluster, wherein said DBaaS cluster comprises one or more nodes, wherein each of said one or more nodes comprises one or more pods containing a group of one or more containers;

generating a first set of tracing data from said user service requests by a service mesh facilitating service-to-service communication between said service cluster and said DBaaS cluster;

generating a second set of tracing data by said DBaaS cluster from handling said user service requests;

generating a dependency tree to discover application relationships to identify potential bottlenecks in nodes of said DBaaS cluster based on said first and second sets of tracing data; and scaling one or more pods of a node of said DBaaS cluster based on said dependency tree.

2. The method as recited in claim 1 further comprising:

analyzing said first and second sets of tracing data; and generating said dependency tree based on said analyzing of said first and second sets of tracing data.

3. The method as recited in claim 1 further comprising:

monitoring service requests received by said DBaaS cluster;

identifying a chain of requests of different types generated from a monitored service request; and identifying services in nodes of said DBaaS cluster to handle said chain of requests from said dependency tree.

4. The method as recited in claim 3 further comprising:

identifying a potential bottleneck in handling said identified services in a node of said DBaaS cluster using said dependency tree and said first and second sets of tracing data.

5. The method as recited in claim 4 further comprising:

analyzing consumption predictors for components of said node of said DBaaS cluster identified as being said potential bottleneck; and determining utilization of resources for said components of said node of said DBaaS cluster identified as being said potential bottleneck based on said analyzed consumption predictors.

6. The method as recited in claim 5 further comprising:

predicting utilization of resources for said components of said node of said DBaaS cluster identified as being said potential bottleneck based on said determined utilization of resources for said components of said node of said DBaaS cluster identified as being said potential bottleneck and a timeline of called components of said DBaaS cluster; and executing a scale operation to scale a number of said one or more pods in said node of said DBaaS cluster identified as being said potential bottleneck in response to said predicted utilization of resources being above or below a threshold level.

7. The method as recited in claim 5, wherein said consumption predictors comprise one or more of the following: CPU utilization, memory utilization, disk utilization, input/output utilization, timeline of called components of said node of said DBaaS cluster identified as being said potential bottleneck, a traffic generation model and relationship of components of said node of said DBaaS cluster identified as being said potential bottleneck.

8. A computer program product for scaling a resource of a Database as a Service (DBaaS) cluster in a cloud platform, the computer program product comprising one or more computer readable storage mediums having program code embodied therewith, the program code comprising programming instructions for:

receiving user service requests from a service cluster to be processed by said DBaaS cluster, wherein said DBaaS cluster comprises one or more nodes, wherein each of said one or more nodes comprises one or more pods containing a group of one or more containers;

generating a first set of tracing data from said user service requests by a service mesh facilitating service-to-service communication between said service cluster and said DBaaS cluster;

generating a second set of tracing data by said DBaaS cluster from handling said user service requests;

generating a dependency tree to discover application relationships to identify potential bottlenecks in nodes of said DBaaS cluster based on said first and second sets of tracing data; and scaling one or more pods of a node of said DBaaS cluster based on said dependency tree.

9. The computer program product as recited in claim 8, wherein the program code further comprises the programming instructions for:

analyzing said first and second sets of tracing data; and generating said dependency tree based on said analyzing of said first and second sets of tracing data.

10. The computer program product as recited in claim 8, wherein the program code further comprises the programming instructions for:

monitoring service requests received by said DBaaS cluster;

identifying a chain of requests of different types generated from a monitored service request; and identifying services in nodes of said DBaaS cluster to handle said chain of requests from said dependency tree.

11. The computer program product as recited in claim 10, wherein the program code further comprises the programming instructions for:

identifying a potential bottleneck in handling said identified services in a node of said DBaaS cluster using said dependency tree and said first and second sets of tracing data.

12. The computer program product as recited in claim 11, wherein the program code further comprises the programming instructions for:

analyzing consumption predictors for components of said node of said DBaaS cluster identified as being said potential bottleneck; and determining utilization of resources for said components of said node of said DBaaS cluster identified as being said potential bottleneck based on said analyzed consumption predictors.

13. The computer program product as recited in claim 12, wherein the program code further comprises the programming instructions for:

predicting utilization of resources for said components of said node of said DBaaS cluster identified as being said potential bottleneck based on said determined utilization of resources for said components of said node of said DBaaS cluster identified as being said potential bottleneck and a timeline of called components of said DBaaS cluster; and executing a scale operation to scale a number of said one or more pods in said node of said DBaaS cluster identified as being said potential bottleneck in response to said predicted utilization of resources being above or below a threshold level.

14. The computer program product as recited in claim 12, wherein said consumption predictors comprise one or more of the following: CPU utilization, memory utilization, disk utilization, input/output utilization, timeline of called components of said node of said DBaaS cluster identified as being said potential bottleneck, a traffic generation model and relationship of components of said node of said DBaaS cluster identified as being said potential bottleneck.

15. A system, comprising:

a memory for storing a computer program for scaling a resource of a Database as a Service (DBaaS) cluster in a cloud platform; and a processor connected to said memory, wherein said processor is configured to execute program instructions of the computer program comprising:

receiving user service requests from a service cluster to be processed by said DBaaS cluster, wherein said DBaaS cluster comprises one or more nodes, wherein each of said one or more nodes comprises one or more pods containing a group of one or more containers;

generating a first set of tracing data from said user service requests by a service mesh facilitating service-to-service communication between said service cluster and said DBaaS cluster;

generating a second set of tracing data by said DBaaS cluster from handling said user service requests;

generating a dependency tree to discover application relationships to identify potential bottlenecks in nodes of said DBaaS cluster based on said first and second sets of tracing data; and scaling one or more pods of a node of said DBaaS cluster based on said dependency tree.

16. The system as recited in claim 15, wherein the program instructions of the computer program further comprise:

analyzing said first and second sets of tracing data; and generating said dependency tree based on said analyzing of said first and second sets of tracing data.

17. The system as recited in claim 15, wherein the program instructions of the computer program further comprise:

monitoring service requests received by said DBaaS cluster;

identifying a chain of requests of different types generated from a monitored service request; and identifying services in nodes of said DBaaS cluster to handle said chain of requests from said dependency tree.

18. The system as recited in claim 17, wherein the program instructions of the computer program further comprise:

identifying a potential bottleneck in handling said identified services in a node of said DBaaS cluster using said dependency tree and said first and second sets of tracing data.

19. The system as recited in claim 18, wherein the program instructions of the computer program further comprise:

analyzing consumption predictors for components of said node of said DBaaS cluster identified as being said potential bottleneck; and determining utilization of resources for said components of said node of said DBaaS cluster identified as being said potential bottleneck based on said analyzed consumption predictors.

20. The system as recited in claim 19, wherein the program instructions of the computer program further comprise:

predicting utilization of resources for said components of said node of said DBaaS cluster identified as being said potential bottleneck based on said determined utilization of resources for said components of said node of said DBaaS cluster identified as being said potential bottleneck and a timeline of called components of said DBaaS cluster; and executing a scale operation to scale a number of said one or more pods in said node of said DBaaS cluster identified as being said potential bottleneck in response to said predicted utilization of resources being above or below a threshold level.

* * * * *